US011950058B2

(12) United States Patent
Liu et al.

(10) Patent No.: US 11,950,058 B2
(45) Date of Patent: Apr. 2, 2024

(54) METHOD, DEVICE AND SYSTEM FOR PROVIDING COMMUNICATION OF DATA BETWEEN A HEARING DEVICE AND AN AUXILIARY DEVICE

(71) Applicant: GN Hearing A/S, Ballerup (DK)

(72) Inventors: Hong Liu, Værløse (DK); Brian Dam Pedersen, Ringsted (DK)

(73) Assignee: GN HEARING A/S, Ballerup (DK)

( * ) Notice: Subject to any disclaimer, the term of this patent is extended or adjusted under 35 U.S.C. 154(b) by 332 days.

(21) Appl. No.: 17/443,162

(22) Filed: Jul. 21, 2021

(65) Prior Publication Data

US 2021/0352420 A1  Nov. 11, 2021

Related U.S. Application Data

(63) Continuation of application No. PCT/EP2020/052362, filed on Jan. 30, 2020.

(30) Foreign Application Priority Data

Jan. 30, 2019  (EP) .................................... 19154463

(51) Int. Cl.
*H04R 25/00* (2006.01)
*H04W 4/80* (2018.01)
*H04W 84/18* (2009.01)

(52) U.S. Cl.
CPC ......... *H04R 25/554* (2013.01); *H04R 25/552* (2013.01); *H04R 2225/55* (2013.01)

(58) Field of Classification Search
None
See application file for complete search history.

(56) References Cited

U.S. PATENT DOCUMENTS 9,924,281 B2   3/2018 Pedersen et al.
2008/0008341 A1   1/2008 Edwards
(Continued)

FOREIGN PATENT DOCUMENTS

WO  WO 2018/228883  12/2018

OTHER PUBLICATIONS

PCT International Search Report and Written Opinion for International Appln. No. PCT/EP2020/052362 dated Mar. 16, 2020.
(Continued)

*Primary Examiner* — Qin Zhu
(74) *Attorney, Agent, or Firm* — Vista IP Law Group, LLP

(57) ABSTRACT

A binaural hearing system, and a method of providing communication of data are provided. The method comprises providing third communication of data between a first auxiliary device and a second auxiliary device, wherein the step of providing third communication of data comprises: providing third primary RF communication between the first auxiliary device and a first hearing device of a binaural hearing system; providing third secondary RF communication between the second auxiliary device and a second hearing device of the binaural hearing system; and providing third tertiary communication between the second hearing device and the first hearing device, wherein the step of providing third primary RF communication comprises utilizing a first RF transceiver of the first hearing device, and wherein the step of providing third secondary RF communication comprises utilizing a second RF transceiver of the second hearing device.

19 Claims, 5 Drawing Sheets

(56) References Cited

U.S. PATENT DOCUMENTS

| | | | |
|---|---|---|---|
| 2015/0124976 A1* | 5/2015 | Pedersen ............ | A61N 1/36038 |
| | | | 381/23.1 |
| 2016/0037270 A1 | 2/2016 | Polinske et al. | |
| 2017/0078809 A1* | 3/2017 | Solum .................... | H04R 25/70 |
| 2017/0171673 A1 | 6/2017 | Solum | |
| 2018/0041849 A1* | 2/2018 | Farmani ............... | H04R 25/405 |
| 2018/0084456 A1 | 3/2018 | Gostev et al. | |
| 2018/0098161 A1* | 4/2018 | Popovski ............. | H04R 25/554 |
| 2018/0176700 A1 | 6/2018 | Pedersen et al. | |
| 2018/0184234 A1 | 6/2018 | Chen et al. | |

OTHER PUBLICATIONS

Basagni, S., et al: "Multihop Scatternet Formation for Bluetooth Networks" Vehicular Technology Conference, New, NY, US. vol. 1, May 6, 2002, pp. 424-428, XP001210421.

Linda Xiaoning Liu: "Bluetooth Information Exchange Network", Telecommunication Networks and Applications Conference, 2008. ATNAC 2008. Australasian, May 30, 2014, pp. 1-113, XP055674384.

Extended European Search Report for EP Patent Appln. No. 19154463.4 dated Mar. 8, 2019.

Foreign OA for CN Patent Appln. No. 202080011472.0 dated Aug. 9, 2023.

English Translation for Foreign OA for CN Patent Appln. No. 202080011472.0 dated Aug. 9, 2023.

Foreign Communication for EP Patent Appln. No. 20701801.1 dated Sep. 18, 2023.

* cited by examiner

METHOD, DEVICE AND SYSTEM FOR PROVIDING COMMUNICATION OF DATA BETWEEN A HEARING DEVICE AND AN AUXILIARY DEVICE

RELATED APPLICATION DATA

This application is a continuation of International Patent Application No. PCT/EP2020/052362 filed on Jan. 30, 2020, which claims priority to, and the benefit of, European Patent Application No. 19154463.4 filed on Jan. 30, 2019. The entire disclosures of the above applications are expressly incorporated by reference herein.

FIELD

The present disclosure relates to communication of data between a hearing device and an auxiliary device.

BACKGROUND

When communicating data wirelessly between two devices, e.g. a first device and a second device, a wireless communication protocol, such as Bluetooth Low Energy, may be utilized for establishing a connection between the two devices. Such protocol may require that one of the two devices, e.g. the first device, is operated as a master device while the other device, e.g. the second, is operated as a slave device when a connection utilizing the protocol is established between the two devices. Further, the protocol may support that a slave device is connected to no more than one master device at any given time, while the master device may be connected to several slave devices simultaneously. Accordingly, it may be required that the connection between the master device and the slave device is broken before the protocol can be utilized for establishing a connection between the first device and a third device. Furthermore, two devices, each operating as a master, may not be allowed to synchronize their respective communication protocols and/or transmission schemes, which are utilized for communication with their respective slaves.

There is a need in the industry to overcome the above-mentioned and other shortcomings.

According to some embodiments, the second device, referred to above, may be a hearing device, such as a hearing aid, and the first device, referred to above, may be an auxiliary device, such as a computing device or a mobile device, such as a smartphone or a tablet.

It may be an object to facilitate wireless communication of data between a hearing device and an auxiliary device. The wireless communication may be bi-directional. Communication of data may imply transmission of the data. It may be an object to provide improved/alternative functionality utilizing RF communication between a first hearing device and a first auxiliary device. It may be an object to utilize RF communication between a first hearing device and a first auxiliary device for communication of data between a second hearing device and the first auxiliary device. It may be an object to provide a method and a first hearing device configured to enable communication of data between a first auxiliary device and a second hearing device, wherein the communication of data comprises: RF communication between the first hearing device and the first auxiliary device; and communication between the first hearing device and the second hearing device.

In order to achieve one or more of the above-mentioned objectives and/or further objectives, one or more embodiments may be provided according to any of the following aspects.

According to a first aspect, there is provided a first hearing device comprising a first RF transceiver, wherein the first hearing device is configured for facilitating first communication of data between a first auxiliary device and a second hearing device, wherein the first communication of data comprises: first primary RF communication between the first hearing device and the first auxiliary device; and first secondary communication between the first hearing device and the second hearing device, wherein the first primary RF communication utilizes the first RF transceiver.

According to a second aspect, there is provided a binaural hearing device system comprising the first hearing device, e.g. according to the first aspect, and the second hearing device, e.g. as described in connection with the first aspect. The second hearing device may comprise a second RF transceiver. The binaural hearing device system may imply a wireless binaural hearing device system. The second hearing device may be configured for communication with a second auxiliary device.

According to a third aspect, there is provided a method of providing communication of data, comprising providing first communication of data between a first auxiliary device and a second hearing device, wherein the step of providing first communication of data comprises: providing first primary RF communication between a first hearing device and the first auxiliary device; and providing first secondary communication between the first hearing device and the second hearing device, wherein the step of providing first primary RF communication comprises utilizing a first RF transceiver of the first hearing device.

According to a fourth aspect, there is provided a system comprising a binaural hearing device system and a first auxiliary device, such as a remote microphone device, wherein the binaural hearing device system is configured for being wirelessly connected to two auxiliary devices simultaneously, wherein the two auxiliary devices comprises the first auxiliary device and a second auxiliary device.

One or more embodiments described herein may enable communication of data between two devices without any direct communication of data between those two devices. One or more embodiments described herein may alleviate requirements for communication of data between two devices, since the second hearing device may utilize a connection and/or a common communication protocol with the first hearing device for communication of data between the second hearing device and the first auxiliary device.

It is to be understood that both the foregoing general description and the following detailed description are exemplary and are intended to provide further explanation of the claimed invention. Other systems, methods and features will be or become apparent to one having ordinary skill in the art upon examining the following drawings and detailed description. It is intended that all such additional systems, methods, and features be included in this description, be within the scope of the claimed invention.

BRIEF DESCRIPTION OF THE DRAWINGS

The drawings illustrate the design and utility of embodiments, in which similar elements may be referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings may depict only typical embodiments and are not therefore to be considered limiting of its scope.

In the following, embodiments are described in more detail with reference to the appended drawings, wherein.

DETAILED DESCRIPTION

Figure 1:
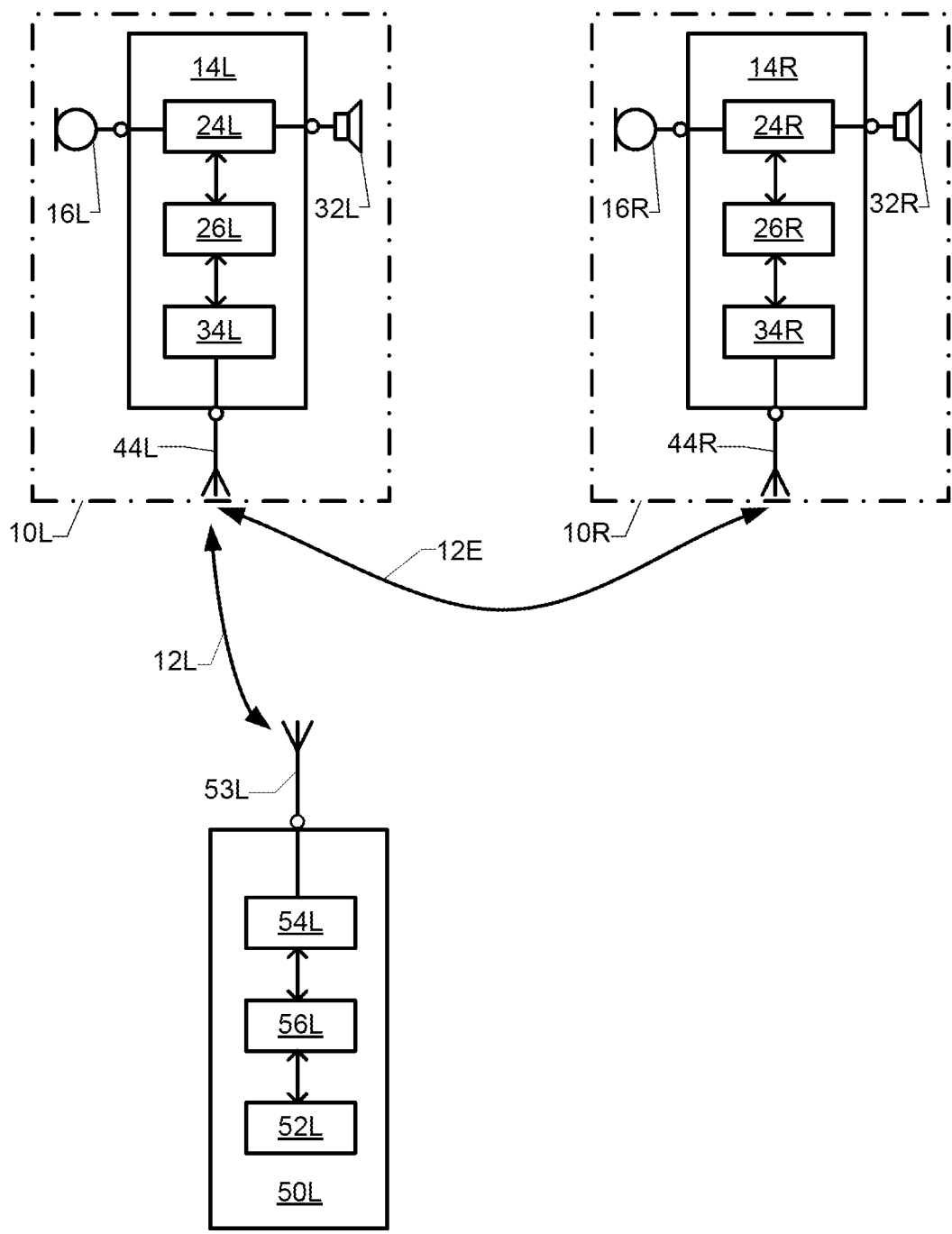
FIG. 1 schematically illustrates a first hearing device in accordance with an embodiment.

One more or all of following definitions may be applied for interpreting terms applied to features of the embodiments disclosed herein, and are meant only to define elements within the disclosure. No limitations on terms used within the claims are necessarily intended, or should necessarily be derived, thereby. Terms used within the appended claims may or should only be limited by their customary meaning within the applicable arts.

Throughout the present disclosure the terms first, second, and third, as well as the terms primary, secondary, tertiary, as well as any combination hereof does not necessarily indicate any timing and/or prioritizing of the respective events or steps. Accordingly, one event, such as a first event, may occur before, during, or after another event, such as a second event, or the one event may occur at any combination of before, during, and after the other event.

Communication of data between a second device, such as the second hearing device, and a first device, such as the first auxiliary device, may imply that data is transferred from the first device to the second device and/or vice versa. The transferal or transmittal may be via another device, such as the first hearing device.

A third device, such as the first hearing device, which is configured for facilitating communication of data between two other devices, such as between the first auxiliary device and the second hearing device, may imply that the third device is configured for communication with each of the two other devices, such that the data may be transferred from one of the two devices to the other via the third device.

First communication of data between the first auxiliary device and the second hearing device may imply communication of first data between the first auxiliary device and the second hearing device.

The first secondary communication between the first hearing device and the second hearing device may comprise communication of the first data.

The first primary RF communication between the first hearing device and the first auxiliary device may comprise communication of the first data. The first primary RF communication may comprise communication of first primary data, which may not be intended for and/or may not be from the second hearing device. The first primary data may be intended for and/or may be generated at the first hearing device.

RF communication may imply communication utilizing one or more RF frequencies, e.g. utilizing an RF carrier frequency. An RF frequency for RF communication may imply a frequency in the range between 300 megahertz (MHz) and 3 gigahertz (GHz).

Providing communication of data between a second device, such as the second hearing device, and a first device, such as the first auxiliary device, may imply a step of transmitting data from one of the first device and the second device to the other, e.g. via a third device, such as the first hearing device.

The first secondary communication may comprise first secondary RF communication between the first hearing device and the second hearing device. The first secondary RF communication may utilize the first RF transceiver. Utilizing the first RF transceiver for both the first primary RF communication and the first secondary communication may alleviate the need for a further transceiver of the first hearing device, which in turn may reduce costs and/or reduce spatial needs for dedicated hardware at the respective hearing device. Additionally, conversion and/or transfer of data format may be alleviated between the step of providing the first primary RF communication and the step of providing the first secondary communication.

Communication of data between a hearing device and an auxiliary device may for instance be utilized for any one or more of: automatic fitting of the hearing device, debugging of the hearing device, controlling the hearing device, monitoring of the hearing device, providing audio data to or from the hearing device, and providing processing power to the hearing device.

Any RF transceiver may comprise a/the corresponding RF antenna.

The first hearing device may comprise a first secondary RF transceiver. The second hearing device may comprise a second secondary RF transceiver. The first hearing device may thereby comprise the first RF transceiver and the first secondary RF transceiver. The first RF transceiver and the first secondary RF transceiver may utilize different RF technologies. The second hearing device may thereby comprise the second RF transceiver and the second secondary RF transceiver. The first RF transceiver and the second secondary RF transceiver may utilize different RF technologies.

The first secondary RF transceiver and/or the second secondary RF transceiver may be configured for NFMI communication between two hearing devices, such as two hearing aids.

The first secondary RF transceiver and/or the second secondary RF transceiver may be utilized for the first secondary RF communication and/or the second secondary RF communication and/or the third tertiary RF communication.

Communication between the first hearing device and the second hearing device may comprise near-field magnetic induction communication (NFMI) via respective transmitters, e.g. forming part of respective transceivers, of the respective hearing devices configured for NFMI communication, e.g. via the first secondary RF transceiver of the first hearing device and via the second secondary RF transceiver of the second hearing device. The respective transmitters and/or transceivers, which are configured for NFMI communication, may comprise respective NF transceivers of the respective hearing devices. An NF transceiver may be understood as a transceiver configured for NFMI communication such as via a respective NF antenna. The first secondary communication and/or the second secondary communication and/or the third tertiary communication may comprise NFMI communication.

The first hearing device may comprise a first NF transceiver. The second hearing device may comprise a second NF transceiver. These NF transceivers may be utilized for providing an NF link/connection between the first hearing device and the second hearing device.

NFMI communication may imply utilization of a not propagating magnetic field for communication between devices. For instance, during use, a magnetic field antenna, for example a coil, in one device, such as the first hearing device, modulates a non-propagating magnetic field, which is received and sensed by means of a magnetic field antenna in another device. An antenna, which is configured for NFMI communication, such as a magnetic field antenna, for example a coil, may be denoted an NF antenna. The first hearing device may comprise a first NF antenna. The second hearing device may comprise a second NF antenna.

When using NFMI communication, the first secondary communication and/or the second secondary communication and/or the third tertiary communication may imply communication utilizing one or more frequencies below 100 MHz, such as in the range between 1 MHz and 50 MHz, such as in the range between 5 MHz and 25 MHz, such as in the range between 3 MHz and 15 MHz. NFMI communication may be denoted NF communication. The abbreviations NFMI and NF may be used interchangeable. One advantage of using NF communication between the first hearing device and the second hearing device when, e.g. when the devices are worn at the respective ears of the user of the hearing devices, is that the communication may be more stable than RF communication since RF communication may be attenuated more than NF communication by the head of the user of the hearing devices. Another advantage of using NF communication between the first hearing device and the second hearing device is that the there is no interference with the RF communication between a respective hearing device and a respective auxiliary device due to utilization of different frequencies.

The first hearing device may comprise a first communication controller connected to the first RF transceiver. The first communication controller may be configured to control the first RF transceiver. One or more embodiments described herein may comprise controlling the first RF transceiver using the first communication controller of the first hearing device. The first communication controller may be configured to control the first NF transceiver. One or more embodiments described herein may comprise controlling the first NF transceiver using the first communication controller of the first hearing device.

The second hearing device may comprise a second communication controller connected to the second RF transceiver. The second communication controller may be configured to control the second RF transceiver. One or more embodiments described herein may comprise controlling the second RF transceiver using the second communication controller of the second hearing device. The second communication controller may be configured to control the second NF transceiver. One or more embodiments described herein may comprise controlling the second NF transceiver using the second communication controller of the second hearing device.

The first communication of data may comprise first relay of data from one of the first auxiliary device and the second hearing device to the other via the first RF transceiver, wherein the first relay of data comprises the first primary RF communication and comprises the first secondary communication, such as the first secondary RF communication. The step of providing first communication of data may comprise providing first relay of data from one of the first auxiliary device and the second hearing device to the other via the first RF transceiver, wherein the first relay of data comprises the first primary RF communication and comprises the first secondary communication.

Throughout the present disclosure use of the expression "relay of data", e.g. used in connection with communication of data from one device, e.g. a source device, to another device, e.g. a destination device, via one or more relay devices, may imply that at least some of the data from the one device is not converted at the one or more relay devices. For instance, relay of data from one of the first auxiliary device and the second hearing device to the other via the first RF transceiver, and accordingly via the first hearing device, may imply that at least some of the data received by the first hearing device is not converted at the first hearing device and/or may imply that at least some of the data is forwarded unchanged. Relay of data may facilitate improved data transfer rate and/or may reduce the processing at the one or more relay devices. Processing at a relay device, such as at the first hearing device when relaying data between the second hearing device and the first auxiliary device, may be reduced since the data format may be transmitted as received. Accordingly, relay of data may reduce power consumption at the one or more relay devices, e.g. at the first hearing device.

Processing, including signal processing, in the hearing device may be performed by dedicated hardware or may be performed in a signal processor, or may be performed in a combination of dedicated hardware and one or more signal processors. As used herein, the terms "processor", "central processor", "message processor", "signal processor", "controller", "system", etc., are intended to refer to CPU-related entities, either hardware, a combination of hardware and software, software, or software in execution. For example, a "processor", "signal processor", "controller", "system", etc., may be, or may not be, limited to be a process running on a processor, a processor, an object, an executable file, a thread of execution, and/or a program. By way of illustration, the terms "processor", "central processor", "message processor", "signal processor", "controller", "system", etc., may designate both an application running on a processor and a hardware processor. One or more "processors", "central processors", "message processors", "signal processors", "controllers", "systems" and the like, or any combination hereof, may reside within a process and/or thread of execution, and one or more "processors", "central processors", "message processors", "signal processors", "controllers", "systems", etc., or any combination hereof, may be localized in one hardware processor, possibly in combination with other hardware circuitry, and/or distributed between two or more hardware processors, possibly in combination with other hardware circuitry.

The term "controller" may describe various apparatus relating to the operation of one or more transceivers, such as one or more RF transceivers and/or one or more NF transceivers. A controller may be implemented in numerous ways (for example, with dedicated hardware) to perform various functions discussed herein. A "processor" is one example of a controller which employs one or more microprocessors that may be programmed using software (for example, microcode) to perform various functions discussed herein. A controller may be implemented with or without employing a processor, and/or may be implemented as a combination of dedicated hardware to perform some functions and a processor (for example, one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs). In various implementations, a processor or controller may be associated with one or more storage media (generically referred to herein as "memory," for example, volatile and non-volatile computer memory such as RAM, PROM, EPROM, and EEPROM, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects discussed herein. The terms "program" or "computer program" are used herein in a generic sense to refer to any type of computer code (for example, software or microcode) that can be employed to program one or more processors or controllers.

The second hearing device may be configured for facilitating second communication of data between the second auxiliary device and the first hearing device. The second communication of data may comprise: second primary RF communication between the second hearing device and the second auxiliary device, wherein the second primary RF communication may utilize the second RF transceiver; and second secondary communication between the second hearing device and the first hearing device.

The second secondary communication may comprise second secondary RF communication between the second hearing device and the first hearing device. The second secondary RF communication may utilize the second RF transceiver.

The first communication of data and the second communication of data may comprise communication of different data.

The second communication of data may coexist with the first communication of data. For instance, the second primary RF communication may coexist with the first primary RF communication.

Coexistence may imply that at least part of the respective communication and/or event exist at the same time.

Second communication of data between the second auxiliary device and the first hearing device may imply communication of second data between the second auxiliary device and the first hearing device.

The second secondary communication between the first hearing device and the second hearing device may comprise communication of the second data. The second secondary communication may comprise the first secondary communication or part thereof. For instance, the first secondary communication may comprise transmission of the first data in one direction, e.g. from the second hearing device to the first hearing device, and transmission of a first acknowledgement in the other direction. While transmitting the first acknowledgement from the first hearing device to the second hearing device, transmission of the second data may be included.

The second primary RF communication between the second hearing device and the second auxiliary device may comprise communication of the second data. The second primary RF communication may comprise communication of second primary data, which may not be intended for and/or may not be from the first hearing device. The second primary data may be intended for and/or may be generated at the second hearing device.

Provision of a method and or a binaural hearing device configured for facilitating first communication of data and configured for facilitating second communication of data according to one or more embodiments described herein may enable that both the first and second hearing devices may have access to two auxiliary devices simultaneously.

Provision of a method and/or a binaural hearing device system configured for facilitating first communication of data and configured for facilitating second communication of data according to one or more embodiments described herein may enable reduced power consumption, e.g. since each of the first and second hearing devices only needs to communication with one auxiliary device each. Communication between the first and second hearing device may be less power consuming for any one or more of the following reasons: a protocol which is designed for the first and second hearing devices may be utilized instead of a standard protocol, the first and second hearing devices may be closer to each other than the distance from a respective auxiliary device and a respective hearing device.

The second communication of data may comprise second relay of data from one of the second auxiliary device and the first hearing device to the other via the second RF transceiver. The second relay of data may comprise the second primary RF communication. The second relay of data may comprise the second secondary communication, such as the second secondary RF communication.

The binaural hearing device system may be configured for facilitating third communication of data between the first auxiliary device and the second auxiliary device. The third communication of data may comprise: third primary RF communication between the first hearing device and the first auxiliary device, wherein the third primary RF communication may utilize the first RF transceiver; third secondary RF communication between the second hearing device and the second auxiliary device, wherein the third secondary RF communication may utilize the second RF transceiver; and third tertiary communication between the second hearing device and the first hearing device.

The third tertiary communication may comprise third tertiary RF communication between the second hearing device and the first hearing device. The third tertiary RF communication may utilize the first RF transceiver and the second RF transceiver.

The third tertiary communication may comprise third tertiary NF communication between the second hearing device and the first hearing device. The third tertiary NF communication may utilize the first NF transceiver and the second NF transceiver.

The third communication of data between the first auxiliary device and the second auxiliary device may comprise the first communication of data, wherein the third primary RF communication comprises the first primary RF communication, and wherein the third tertiary communication comprises the first secondary communication.

However, according to one or more embodiments, the third communication of data does not imply existence of the first communication of data and/or of the second communication of data.

Third communication of data between the first auxiliary device and the second auxiliary device may imply communication of third data between the first auxiliary device and the second auxiliary device.

Existence of third data does not necessarily imply existence of first data and/or second data.

The third primary RF communication between the first hearing device and the first auxiliary device may comprise communication of the third data.

The third secondary RF communication between the second hearing device and the second auxiliary device may comprise communication of the third data.

The third tertiary communication between the second hearing device and the first hearing device may comprise communication of the third data.

The third communication of data may comprise third relay of data from one of the first auxiliary device and the second auxiliary device to the other via the first RF transceiver and the second RF transceiver. The third relay of data may comprise the third primary RF communication, the third secondary RF communication, and the third tertiary communication.

One or more embodiments described herein may comprise establishing and/or utilizing a first primary wireless connection between the first hearing device and the first auxiliary device. The first primary wireless connection may be a bi-directional wireless connection. A bi-directional wireless connection may imply a wireless connection configured for bi-directional communication. The first primary wireless connection may utilize a first primary wireless communication protocol. The first primary RF communication may utilize the first primary wireless communication protocol and/or may utilize the first primary wireless connection.

One or more embodiments described herein may comprise establishing and/or utilizing a second primary wireless connection between the second hearing device and the second auxiliary device. The second primary wireless connection may be a bi-directional wireless connection. The second primary wireless connection may utilize a second primary wireless communication protocol. The second primary RF communication may utilize the second primary wireless communication protocol and/or may utilize the second primary wireless connection. The second primary wireless communication protocol may be the same as the first primary wireless communication protocol.

The first primary wireless communication protocol and/or the second primary wireless communication protocol may be a standard protocol.

The first primary wireless communication protocol and/or the second primary wireless communication protocol may be compatible with and/or may include any one or more of: Bluetooth, Bluetooth low energy (abbreviated: Bluetooth LE or BLE), Wi-Fi, and ZigBee. Bluetooth Low Energy may imply a subset of the Bluetooth 4.0 Core Specification.

One or more embodiments described herein may comprise establishing and/or utilizing a secondary wireless connection between the first hearing device and the second hearing device. The secondary wireless connection may be a bi-directional wireless connection. The secondary wireless connection may utilize a secondary wireless communication protocol. The secondary wireless communication protocol may be different from the second primary wireless communication protocol and/or may be different from the first primary wireless communication protocol. The secondary wireless communication protocol may be a non-standard protocol, such as a non-standard proprietary protocol. The second secondary RF communication may utilize the secondary wireless communication protocol and/or may utilize the secondary wireless connection. The first secondary RF communication may utilize the secondary wireless communication protocol and/or may utilize the secondary wireless connection.

A wireless connection between two devices may refer to an established wireless link between the two devices.

The first primary wireless connection may be kept or sought kept during the first secondary RF communication.

The second primary wireless connection may be kept or sought kept during the second secondary RF communication.

The first primary wireless connection may be restored in case the first primary wireless connection is inadvertently broken, e.g. during the first communication of data.

The second primary wireless connection may be restored in case the second primary wireless connection is inadvertently broken, e.g. during the second communication of data.

The first auxiliary device may be configured to operate as a central device and the first hearing device may be configured to operate as a peripheral device.

The first auxiliary device may be configured to operate as a master device and the first hearing device may be configured to operate as a slave device.

The second auxiliary device may be configured to operate as a central device and the second hearing device may be configured to operate as a peripheral device.

The second auxiliary device may be configured to operate as a master device and the second hearing device may be configured to operate as a slave device.

For one or more embodiments utilizing e.g. BLE as wireless communication protocol, once a dedicated connection is established, a BLE peripheral can normally only connect to one BLE central device at a time, which device after the connection are referred to as a BLE slave device and a BLE master device, respectively. Accordingly, the respective connection must normally be broken for the respective BLE slave to establish another connection to another BLE central/master device. However, since a different wireless communication protocol may be utilized between the first hearing device and the second hearing device than the respective wireless protocol utilized for communication between a respective hearing device (e.g., first hearing device), and the respective auxiliary device, the respective BLE connections does not necessarily need to be broken between a respective hearing device and the respective auxiliary device (e.g., first auxiliary device) during communication between the first hearing device and the second hearing device, even if using the same carrier frequency for all communication between the respective devices.

A carrier frequency, e.g. as utilized by any one or more of the following: {the first primary RF communication, the first secondary RF communication, the second primary RF communication, and the second secondary RF communication}, may for instance be 2.4 GHz or another RF carrier frequency if the respective RF transceivers and/or RF antennas supports this. The first primary RF communication and the first secondary RF communication may utilize the same carrier frequency, such as 2.4 GHz.

The first primary RF communication may utilize a first primary wireless transmission scheme. The first secondary RF communication may utilize a secondary wireless transmission scheme.

The second primary RF communication may utilize a second primary wireless transmission scheme. The second secondary RF communication may utilize the secondary wireless transmission scheme.

The first hearing device may be configured for facilitating that the secondary wireless transmission scheme is provided and/or adjusted in response to the first primary wireless transmission scheme, e.g. such that coexistence of connection events of the first primary wireless transmission scheme and the secondary wireless transmission scheme are avoided or alleviated.

Coexistence of connection events may imply coexistence in the time domain and/or in the frequency domain. Accordingly, coexistence may be understood as being avoided if there is no coexistence in at least one, such as both, of the time domain and the frequency domain.

The first hearing device may be configured for facilitating that the secondary wireless transmission scheme and the first primary wireless transmission scheme are provided and/or adjusted in coordination with each other, e.g. such that coexistence of connection events of the first primary wireless transmission scheme and the secondary wireless transmission scheme are avoided or alleviated.

The binaural hearing device system may be configured for facilitating that the secondary wireless transmission scheme may be provided and/or adjusted in response to the second primary wireless transmission scheme, e.g. such that coexistence of connection events of the second primary wireless transmission scheme and the secondary wireless transmission scheme are avoided or alleviated.

The binaural hearing device system may be configured for facilitating that the secondary wireless transmission scheme and the second primary wireless transmission scheme are provided and/or adjusted in coordination with each other, e.g. such that coexistence of connection events of the second primary wireless transmission scheme and the secondary wireless transmission scheme are avoided or alleviated.

The the binaural hearing device system may be configured for facilitating that the first primary wireless transmission scheme and the second primary wireless transmission scheme are provided and/or adjusted in coordination with each other, e.g. such that coexistence of connection events of the first primary wireless transmission scheme and the second primary wireless transmission scheme are aimed at and/or provided.

The binaural hearing device system may be configured for utilizing the secondary wireless connection for the provision and/or adjustment in coordination of the first primary wireless transmission scheme and the second primary wireless transmission scheme.

The first hearing device and/or the second hearing device may each comprise a respective hearing aid, such as a BTE, RIE, ITE, ITC, or CIC, etc., hearing aid. The first hearing device and/or the second hearing device may each comprise a respective headset, headphone, earphone, ear defender, or earmuff, etc., such as an Ear-Hook, In-Ear, On-Ear, Over-the-Ear, Behind-the-Neck, Helmet, or Headguard, etc. Typically, only a severely limited amount of power is available from a power supply of a hearing device. For example, power is typically supplied from a conventional $ZnO_2$ battery in a hearing aid. In the design of a hearing aid, the size and the power consumption may be important considerations.

The first hearing device may comprise a first hearing aid comprising: a first microphone, a first receiver, and a first hearing loss processor. The first receiver may comprise a first speaker. The first microphone may be configured for reception of sound and for conversion of the received sound into a corresponding audio signal. The first hearing loss processor may be configured for processing the audio signal into an audio signal compensating a hearing loss of a user of the first hearing aid, e.g. in accordance with a predetermined signal processing algorithm. The first receiver or the first speaker may be connected to an output of the first hearing loss processor for converting the hearing loss compensated audio signal into an output sound signal to be provided to the user of the first hearing aid, e.g. to a first ear of the user.

The first communication controller may be integrated with/within or coupled or connected to the first hearing loss processor. The first hearing loss processor may comprise the first communication controller.

The first hearing device may comprise a first RF antenna. The first primary RF communication may utilize the first RF antenna. The first secondary RF communication may utilize the first RF antenna.

The second hearing device may comprise a second hearing aid comprising: a second microphone, a second receiver, and a second hearing loss processor. The second receiver may comprise a second speaker. The second microphone may be configured for reception of sound and for conversion of the received sound into a corresponding audio signal. The second hearing loss processor may be configured for processing the audio signal into an audio signal compensating a hearing loss of a user of the second hearing aid, e.g. in accordance with a predetermined signal processing algorithm. The second receiver or the second speaker may be connected to an output of the second hearing loss processor for converting the hearing loss compensated audio signal into an output sound signal to be provided to the user of the second hearing aid, e.g. to a second ear of the user.

The second communication controller may be integrated with/within or coupled or connected to the second hearing loss processor. The second hearing loss processor may comprise the second communication controller.

The second hearing device may comprise a second RF antenna. The second primary RF communication may utilize the second RF antenna. The second secondary RF communication may utilize the second RF antenna.

Each of the first and second hearing aids may receive and deliver a binaurally processed hearing loss compensated audio signal to a user or patient via respective receivers.

The first communication of data may comprise communication of data for fitting and/or debugging and/or controlling and/or monitoring behavior of the first hearing aid and/or the second hearing aid.

The second communication of data may comprise communication of data for fitting and/or debugging and/or controlling and/or monitoring behavior of the first hearing aid and/or the second hearing aid.

The third communication of data may comprise communication of data, e.g. denoted third data, for controlling and/or monitoring behavior of the first or second auxiliary device, i.e. for controlling and/or monitoring behavior of the other auxiliary device.

The first auxiliary device may comprise a first remote microphone device, e.g. such as known in the art of hearing aids. The second auxiliary device may comprise a second remote microphone device, e.g. such as known in the art of hearing aids. The remote microphone device may be known as a spouse microphone device. The remote microphone device may be configured for one-to-one conversations and/or one-to-multiple speeches. Alternatively, or additionally, the remote microphone device may be configured for transmit sound of multimedia devices e.g. TV. The remote microphone device may be located relatively far from the user of the hearing devices. The remote microphone device may comprise a directional microphone. The remote microphone device may be designed to be worn by a speaker, e.g. in an intended orientation, e.g. such that a directional microphone hereof provides an intended functionality. Accordingly, a hearing device user at the receiving end of a signal comprising speech from the remote microphone device may experience an improved and/or better quality of sound, e.g. such as improved intelligibility, e.g. compared to sound, such as comprising speech, as received via a microphone of the respective hearing device.

The first auxiliary device may comprise a mobile device, such as a smartphone or tablet, while the second auxiliary device comprises a remote microphone device—or vice versa. The first auxiliary device may comprise a mobile device, such as a smartphone or tablet, or a remote microphone device, while the second auxiliary device comprises a device configured for handling a hearing device—or vice versa. The device configured for handling a hearing device may comprise a device configured for wireless RF communication with the hearing device and configured for any one or more of: programming, fitting, and debugging of the hearing device and/or one or more other hearing devices. The device configured for handling a hearing device may comprise an industry-standard device for programming, fitting, and/or debugging Bluetooth Low Energy (BLE) enabled hearing devices, such as hearing aids. The device configured for handling a hearing device may provide and/or may be utilized as a wireless interface between a hearing device and a computing device comprising any one or more of: a programming program, a fitting program, a debugging program, application software, or any combination hereof.

The third data may comprise control data, such as control data from one auxiliary device, wherein the control data is configured for controlling, e.g. including adjusting, the other auxiliary device. The third data may be configured for controlling one or more properties of one or more microphones of the other auxiliary device. The one or more properties may comprise sound balance and/or directionality.

Accordingly, one auxiliary device, such as the first auxiliary device, may be controlled by a user, such as the user of the hearing devices, operating another auxiliary device, such as the second auxiliary device.

Accordingly, such control may be provided without any need for a direct communication between the two auxiliary devices and/or may be without any need for any communication between the two auxiliary devices other than the third communication, i.e. the communication provided via the two hearing devices.

Furthermore, one auxiliary device, e.g. the first auxiliary device, may be controlled by user, e.g. the user of the hearing devices, operating another auxiliary device, e.g. the second auxiliary device even if the auxiliary device, which is controlled, is out of reach of the user and/or even if the auxiliary device, which is controlled, has insufficient means for receipt of user input directly from the user.

The second auxiliary device may comprise a mobile device, such as a smartphone or tablet, while the first auxiliary device comprises a remote microphone device. The second auxiliary device, e.g. smartphone, may be operated by the user of the hearing devices, while the first auxiliary device is located relatively far from, i.e. beyond reach of, the user of the hearing devices. Accordingly, the user of the hearing devices may utilize the second auxiliary device to control the first auxiliary device, e.g. a remote microphone device, in order to achieve a desired and/or improved sound quality, such as an improved intelligibility from the first auxiliary device. This may be achieved even if the second auxiliary device is out of reach and/or has insufficient means for receipt of user input.

The third data may comprise status data, such as of a sound environment. Status data of one auxiliary device, e.g. the first auxiliary device, e.g. a remote microphone device, may be provided as visual output to the user of the hearing devices by means of a screen of the other auxiliary device, e.g. the second auxiliary device, e.g. a mobile device. Status data of one auxiliary device may be provided to the other auxiliary device prior to and/or during and/or subsequent to controlling the one auxiliary device using the other auxiliary device by means of third data.

The third data may comprise a stream of a sound signal, e.g. in non-realtime. Such stream of a sound signal provided by one, e.g. the first, auxiliary device, may be communicated to the other, e.g. the second, auxiliary device according to the present disclosure and may be processed by the second auxiliary device. Such processing may comprise a conversion and/or translation into text and/or another language, which subsequent may be provided to the binaural hearing device system for presentation of a corresponding sound to the user. Such conversion and/or translation may be provided by means of an intelligent virtual assistant of the auxiliary device receiving the stream of a sound signal. Alternatively, or additionally the stream of a sound signal may be utilized for controlling the auxiliary device receiving the stream of a sound signal, e.g. by means of an intelligent virtual assistant of the auxiliary device receiving the stream of a sound signal. The stream of a sound signal may for instance have a duration of less than 20 seconds, such as less than 10 seconds, such as less than 5 seconds. A short duration may facilitate the communication of the data.

The first and/or second auxiliary device may comprise another type of battery powered device than a hearing device, e.g. utilizing a battery having a substantially larger capacity. Accordingly, it may be desired that one or more power consuming operations of a hearing device may be carried out by an auxiliary device. Accordingly, there may be a desire to communicate data to be processed from a hearing device to an auxiliary device and subsequently, to communicate corresponding processed data from the auxiliary device to the hearing device. The first and/or second auxiliary device may for instance comprise a smartphone, a remote microphone array, a remote signal processor, etc.

Reference is made to FIG. 1, which schematically illustrates a first embodiment of a first hearing device 10L comprising: a first RF transceiver 34L, and a first communication controller 26L connected to the first RF transceiver 34L. The first hearing device 10L is configured for facilitating first communication of data between a first auxiliary device 50L and a second hearing device 10R, wherein the first communication of data comprises: first primary RF communication between the first hearing device 10L and the first auxiliary device 50L, wherein the first primary RF communication utilizes the first RF transceiver 34L; and first secondary RF communication between the first hearing device 10L and the second hearing device 10R, wherein the first secondary RF communication utilizes the first RF transceiver 34L.

The first hearing device 10L comprises a first RF antenna 44L. The first hearing device 10L is configured for facilitating that the first primary RF communication utilizes the first RF antenna 44L, and that the first secondary RF communication utilizes the first RF antenna.

The first hearing device 10L comprises a first hearing aid comprising: a first microphone 16L, a first receiver 32L, and a first hearing loss processor 24L. The first hearing loss processor 24L, the first communication controller 26L, and the first RF transceiver 34L are provided by a first circuit 14L of the first hearing aid. The first circuit 14L comprises respective connections to the first microphone 16L, the first receiver 32L, and the first RF antenna 44L.

The second hearing device 10R comprises a second RF transceiver 34R and a second communication controller 26R connected to the second RF transceiver 34R.

The second hearing device 10R comprises a second RF antenna 44R.

The second hearing device 10R comprises a second hearing aid comprising: a second microphone 16R, a second receiver 32R, and a second hearing loss processor 24R. The second hearing loss processor 24R, the second communication controller 26R, and the second RF transceiver 34R are provided by a second circuit 14R of the second hearing aid. The second circuit 14R comprises respective connections to the second microphone 16R, the second receiver 32R, and the second RF antenna 44R.

The first hearing device 10L is configured for establishing and/or utilizing a first primary wireless connection 12L between the first hearing device and the first auxiliary device 50L. The first hearing device 10L is configured for utilizing the first primary wireless connection 12L for the first primary RF communication.

The first hearing device 10L is configured for establishing and/or utilizing a secondary wireless connection 12E between the first hearing device 10L and the second hearing device 10R.

The first hearing device 10L is configured for utilizing the secondary wireless connection 12E for the first secondary RF communication.

The first auxiliary device 50L comprises a processing unit 52L, an RF antenna 53L, e.g. forming an integrate part of the first auxiliary device, an RF transceiver 54L, and a communication controller 56L. Throughout the present disclosure, whenever an RF antenna, an RF transceiver, or a communication controller is referred to, reference is to those of the first or second hearing device, unless otherwise specified.

Figure 2:
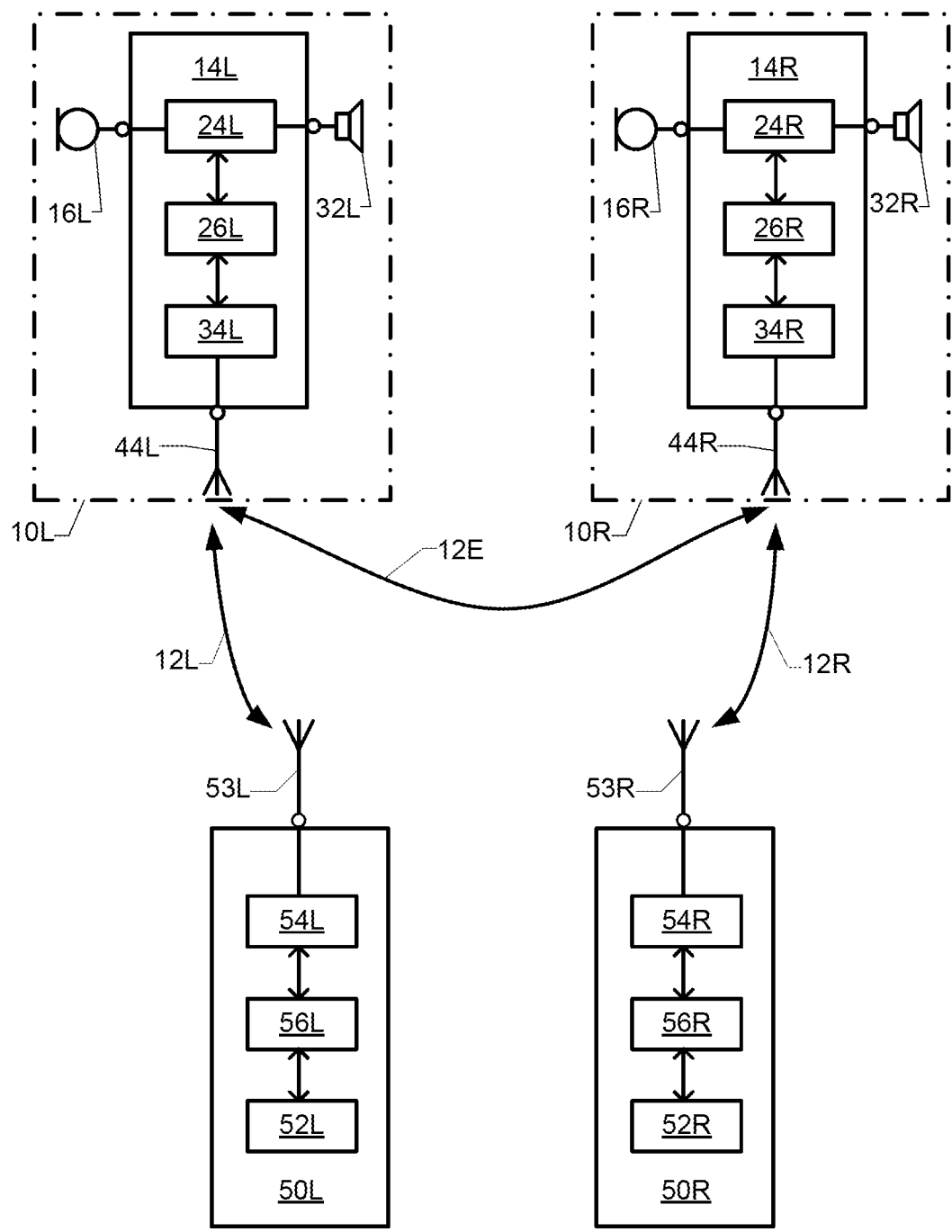
FIG. 2 schematically illustrates a binaural hearing device system in accordance with an embodiment.

Reference is made to FIG. 2, which schematically illustrates a first embodiment of a binaural hearing device system comprising the first hearing device 10L and the second hearing device 10R as described in connection with FIG. 1, wherein the second hearing device 10R is configured for communication with a second auxiliary device 50R via a second primary wireless connection 12R between the second hearing device 10R and the second auxiliary device 50R.

The second auxiliary device 50R comprises a processing unit 52R, an RF antenna 53R, e.g. forming an integrate part of the second auxiliary device, an RF transceiver 54R, and a communication controller 56R.

Figure 11:
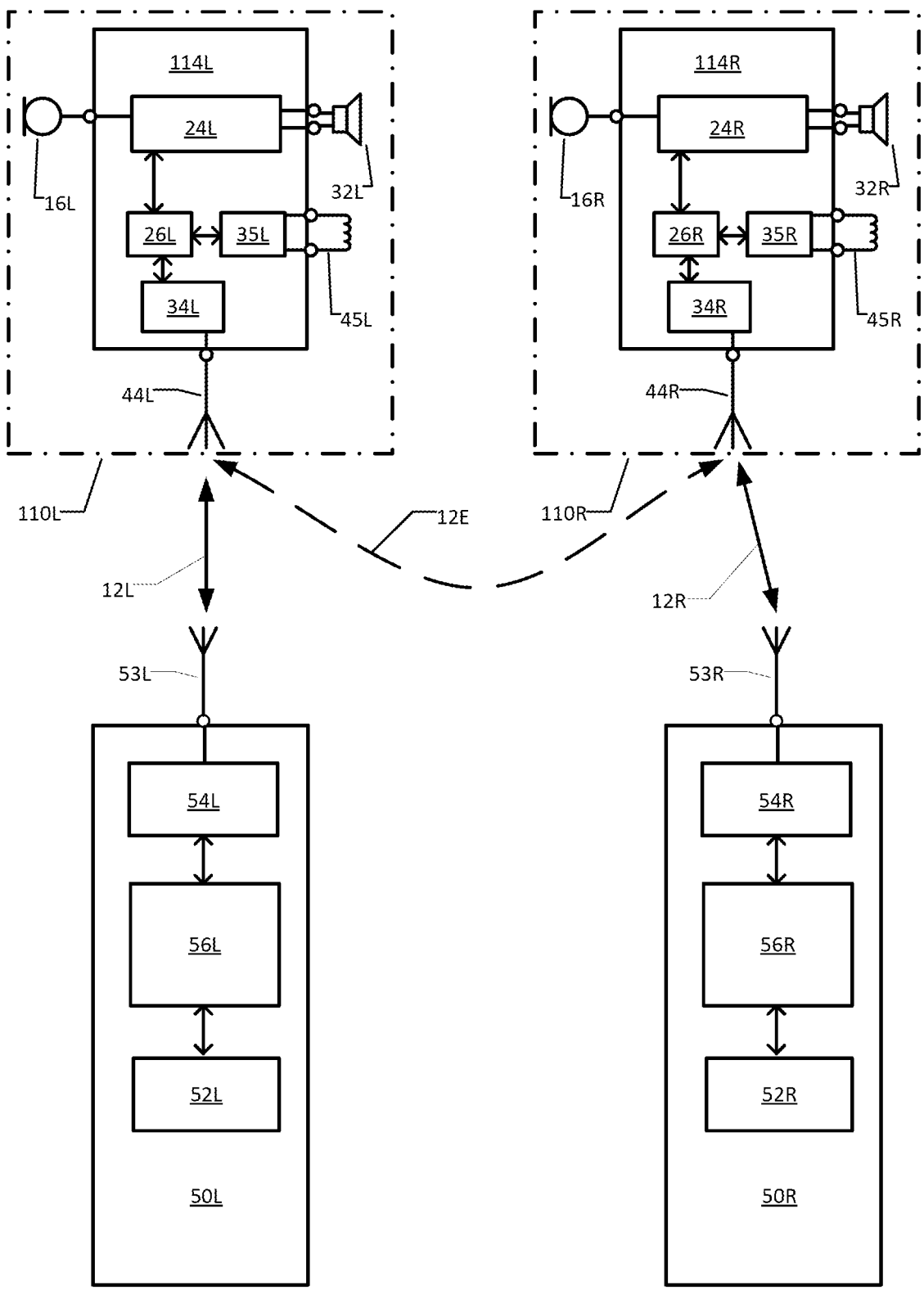
FIG. 11 schematically illustrates a binaural hearing device system in accordance with a second embodiment.

Reference is made to FIG. 11, which schematically illustrates a second embodiment of a binaural hearing device system. The embodiment of FIG. 11 differs from the embodiment of FIG. 2 by comprising respective NF transceivers and NF antennas. The second hearing device 110R comprises a second circuit 114R comprising a second NF transceiver 35R connected to the second communication controller 26R. The second hearing device 110R comprises a second NF antenna 45R. The first hearing device 110L comprises a first circuit 114L comprising a first NF transceiver 35L connected to the first communication controller 26L. The first hearing device 110L comprises a first NF antenna 45L. The embodiment of FIG. 11 furthermore differs from the embodiment of FIG. 2 by having the secondary wireless connection 12E being optional, which is indicated by the dashed line.

The binaural hearing device system illustrated in FIG. 11 is configured for facilitating third communication of data between the first auxiliary device 50L and the second auxiliary device 50R. The third communication of data comprises third primary RF communication between the first hearing device 110L and the first auxiliary device 50L, wherein the third primary RF communication utilizes the first RF transceiver 34L. The third communication of data comprises third secondary RF communication between the second hearing device 110R and the second auxiliary device 50R, wherein the third secondary RF communication utilizes the second RF transceiver 34R. The third communication of data comprises third tertiary communication between the second hearing device 110R and the first hearing device 110L, wherein the third tertiary communication comprises third tertiary NF communication between the second hearing device and the first hearing device, wherein the third tertiary NF communication utilizes the first NF transceiver 35L and the second NF transceiver 35R.

Figure 3:
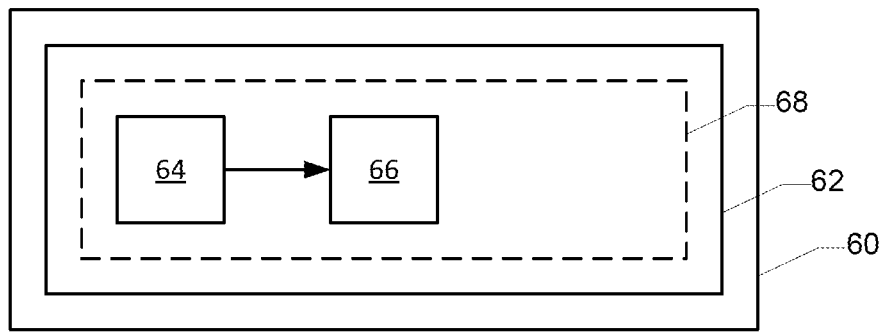
FIGS. 3-10 schematically illustrate various embodiments of respective methods of providing communication of data.

Reference is made to FIG. 3, which schematically illustrates a first embodiment of a method 60 of providing communication of data. The method 60 comprises a step 62 of providing first communication of data between a first auxiliary device and a second hearing device, wherein the step 62 of providing first communication of data comprises: a step 64 of providing first primary RF communication between a first hearing device and the first auxiliary device; and a step 66 of providing first secondary communication between the first hearing device and the second hearing device, wherein the step 64 comprises utilizing a first RF transceiver of the first hearing device, and wherein the method 60 may comprise controlling the first RF transceiver using a first communication controller of the first hearing device.

As indicated by the arrow in FIG. 3, step 64 is carried out before step 66. Accordingly, the method 60 comprises providing first communication of data from the first auxiliary device to the second hearing device via the first hearing device.

As indicated by the broken line rectangle in FIG. 3, the step 62 may comprise a step 68 of providing first relay of data from the first auxiliary device to the second hearing device, wherein step 68 comprises step 64 and step 66.

Figure 4:
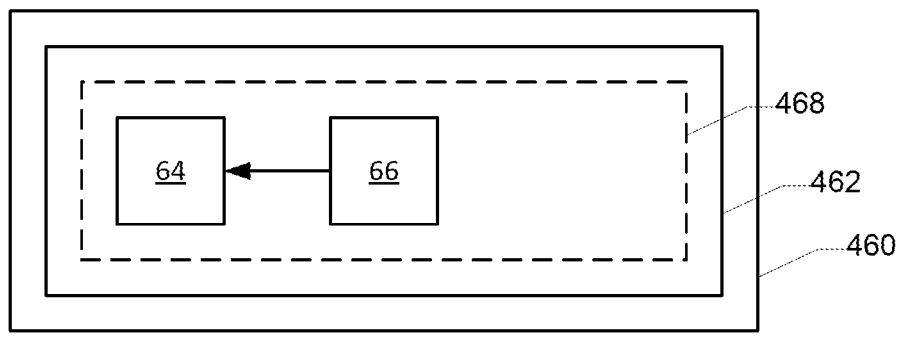

Reference is made to FIG. 4, which schematically illustrates a second embodiment of a method 460 of providing communication of data. The method 460 differs from the method 60 in that the order of the steps 64 and 66 are interchanged.

As indicated by the arrow in FIG. 4, step 66 is carried out before step 64. Accordingly, the method 460 comprises providing first communication of data from the second hearing device to the first auxiliary device via the first hearing device.

As indicated by the broken line rectangle in FIG. 4, a step 462 of providing first communication of data between the first auxiliary device and the second hearing device may comprise a step 468 of providing first relay of data from the second hearing device to the first auxiliary device, wherein step 468 comprises step 66 and step 64.

Figure 5:
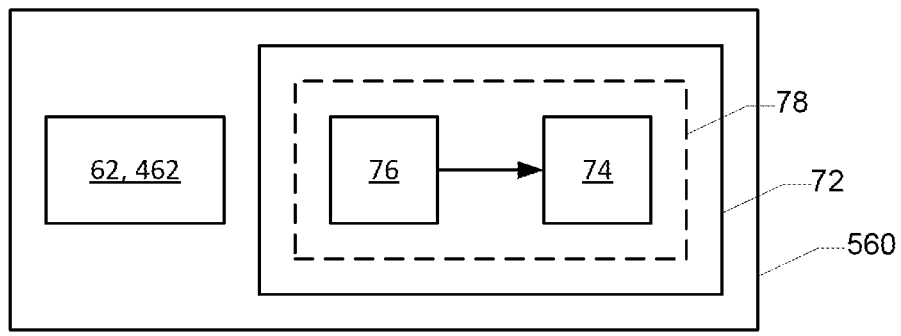

Reference is made to FIG. 5, which schematically illustrates a third embodiment of a method 560 of providing communication of data. The method 560 comprises the step 62 as described in connection with FIG. 3 and/or the step 462 as described in connection with FIG. 4. Furthermore, the method 560 comprises a step 72 of providing second communication of data between a second auxiliary device and the first hearing device, wherein the step 72 comprises: a step 74 of providing second primary RF communication between the second hearing device and the second auxiliary device; and a step 76 of providing second secondary communication between the second hearing device and the first hearing device, wherein the step 74 comprises utilizing a second RF transceiver of the second hearing device.

As indicated by the arrow in FIG. 5, step 76 is carried out before step 74. Accordingly, the method 560 comprises providing second communication of data from the first hearing device to the second auxiliary device via the second hearing device.

As indicated by the broken line rectangle in FIG. 5, the step 72 may comprise a step 78 of providing second relay of data from the first hearing device to the second auxiliary device, wherein step 78 comprises step 76 and step 74.

The step 62 and/or 462 may be carried out before and/or during and/or after the step of providing second communication of data.

Figure 6:
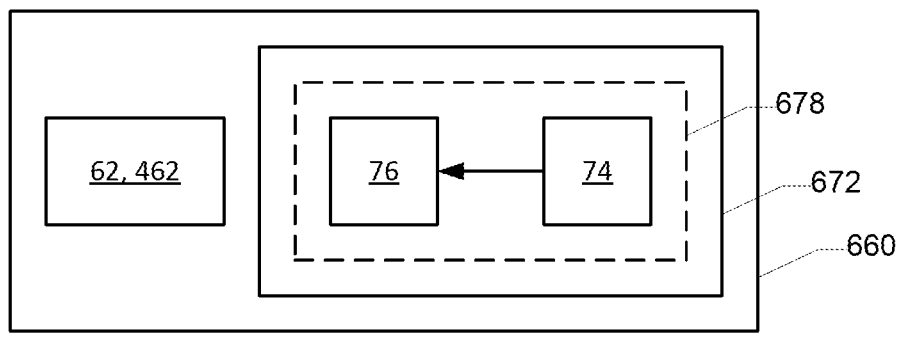

Reference is made to FIG. 6, which schematically illustrates a fourth embodiment of a method 660 of providing communication of data. The method 660 differs from the method 560 in that the order of the steps 74 and 76 are interchanged.

As indicated by the arrow in FIG. 6, step 74 is carried out before step 76. Accordingly, the method 660 comprises providing second communication of data from the second auxiliary device to the first hearing device via the second hearing device.

As indicated by the broken line rectangle in FIG. 6, a step 672 of providing second communication of data between the second auxiliary device and the first hearing device may comprise a step 678 of providing second relay of data from the second auxiliary device to the first hearing device, wherein step 678 comprises step 76 and step 74.

Figure 7:
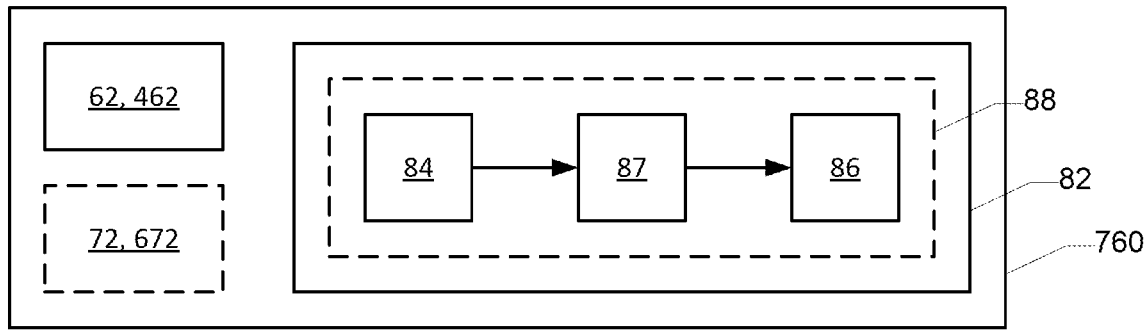

Reference is made to FIG. 7, which schematically illustrates a fifth embodiment of a method 760 of providing communication of data. The method 760 comprises the step 62 as described in connection with FIG. 3 and/or the step 462 as described in connection with FIG. 4. Furthermore, the method 760 may comprise the step 72 as described in connection with FIG. 5 and/or the step 672 as described in connection with FIG. 6. Furthermore, the method 760 comprises a step 82 of providing third communication of data between the first auxiliary device and the second auxiliary device. The step 82 comprises: a step 84 of providing third primary RF communication between the first hearing device and the first auxiliary device; a step 86 of providing third secondary RF communication between the second hearing device and the second auxiliary device; and a step 87 of providing third tertiary communication between the second hearing device and the first hearing device, wherein the step 84 comprises utilizing the first RF transceiver, and wherein the step 86 comprises utilizing the second RF transceiver.

The arrows in FIG. 7, indicates the order of the respective steps. Accordingly, the method 760 comprises providing third communication of data from the first auxiliary device to the second auxiliary device via the first hearing device and the second hearing device.

As indicated by the broken line rectangle in FIG. 7 with ref. 88, the step 82 may comprise a step 88 of providing third relay of data from the first auxiliary device to the second auxiliary device, wherein step 88 comprises step 84, step 87, and step 86.

The step 62 and/or 462 may be carried out before and/or during and/or after the step of providing third communication of data.

The step 72 and/or 672 may be carried out before and/or during and/or after the step of providing third communication of data.

Figure 8:
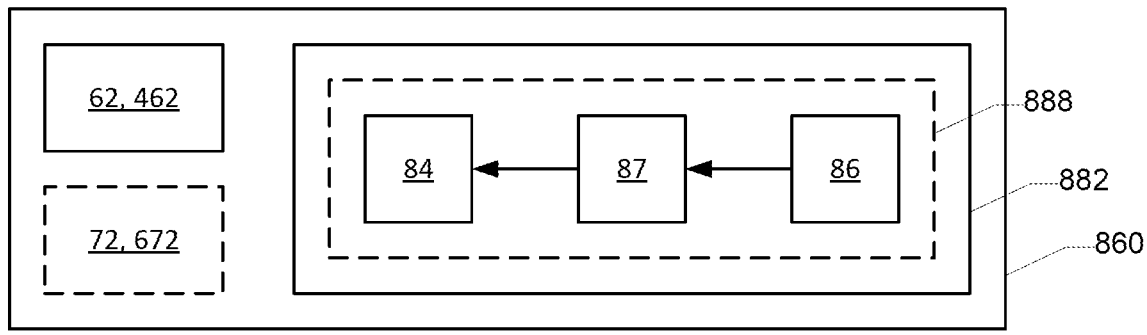

Reference is made to FIG. 8, which schematically illustrates a sixth embodiment of a method 860 of providing communication of data. As indicated by the arrows, the method 860 differs from the method 760 by the order of the steps 86, 87, and 84.

Accordingly, the method 860 comprises providing third communication of data from the second auxiliary device to the first auxiliary device via the second hearing device and the first hearing device.

As indicated by the broken line rectangle in FIG. 8 with ref. 888, a step 882 of providing third communication of data between the first auxiliary device and the second auxiliary device may comprise a step 888 of providing third relay of data from the second auxiliary device to the first auxiliary device, wherein step 888 comprises step 84, step 87, and step 86.

Figure 9:
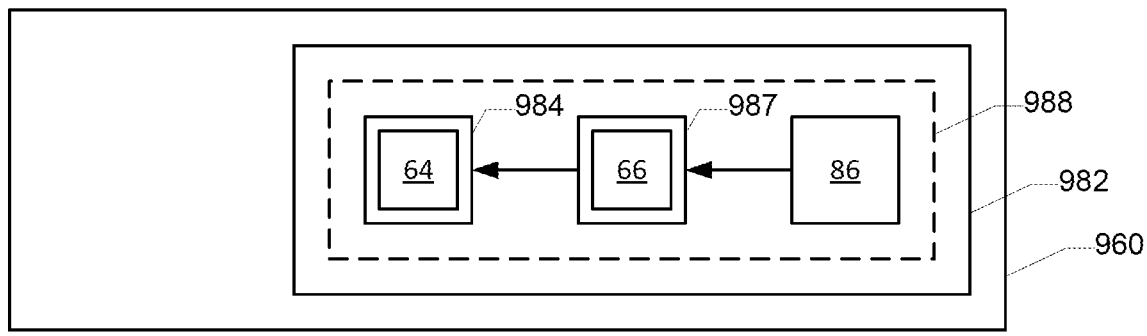

Reference is made to FIG. 9, which schematically illustrates a seventh embodiment of a method 960 of communication of data. The method 960 comprises a step 982 of providing third communication of data between a first auxiliary device and a second auxiliary device, wherein the step 982 comprises: a step 984 of providing third primary RF communication between a first hearing device and the first auxiliary device; a step 86 of providing third secondary RF communication between a second hearing device and the second auxiliary device; and a step 987 of providing third tertiary communication between the second hearing device and the first hearing device, wherein the step of providing third primary RF communication comprises utilizing a first RF transceiver of the first hearing device, and wherein the step of providing third secondary RF communication comprises utilizing a second RF transceiver of the second hearing device.

The step 982 comprises the step of providing first communication of data, which is described in connection with FIG. 4. The step 984 comprises the step 64. The step 987 comprises the step 66.

The method 960 comprises providing third communication of data from the second auxiliary device to the first auxiliary device via the second hearing device and the first hearing device.

As indicated by the broken line rectangle in FIG. 9 with ref. 988, the step 982 may comprise a step 988 of providing third relay of data from the second auxiliary device to the first auxiliary device, wherein step 988 comprises step 984, step 987, and step 86.

Figure 10:
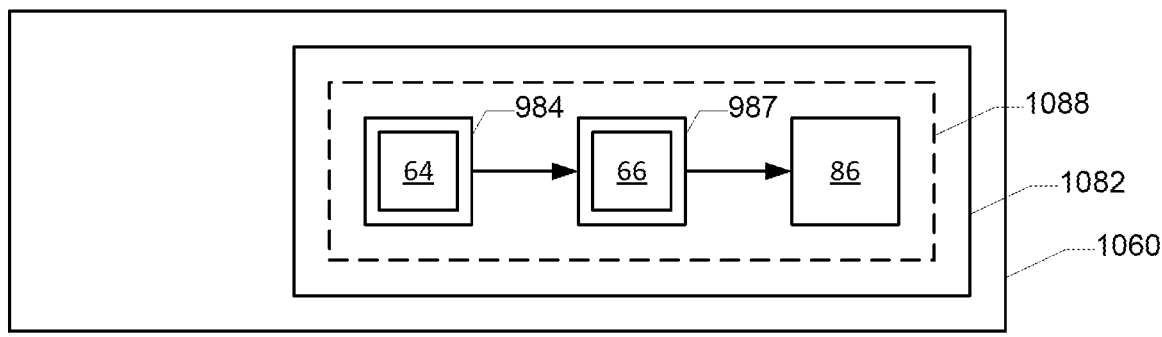

Reference is made to FIG. 10, which schematically illustrates an eighth embodiment of a method 1060 of communication of data. As indicated by the arrows, the method 1060 differs from the method 960 by the order of the steps 86, 987, and 984.

Accordingly, the method 1060 comprises providing third communication of data from the first auxiliary device to the second auxiliary device via the first hearing device and the second hearing device.

As indicated by the broken line rectangle in FIG. 10 with ref. 1088, a step 1082 of providing third communication of data between the first auxiliary device and the second auxiliary device may comprise a step 1088 of providing third relay of data from the first auxiliary device to the second auxiliary device, wherein step 1088 comprises step 984, step 987, and step 86.

One or more embodiments may include any one or any combination of the following items:
1. A first hearing device comprising:
    a first RF transceiver, and
    a first communication controller connected to the first RF transceiver, the first hearing device being configured for facilitating first communication of data between a first auxiliary device and a second hearing device, wherein the first communication of data comprises:
first primary RF communication between the first hearing device and the first auxiliary device, wherein the first primary RF communication utilizes the first RF transceiver; and first secondary RF communication between the first hearing device and the second hearing device, wherein the first secondary RF communication utilizes the first RF transceiver.

2. The first hearing device according to item 1, wherein the first communication of data comprises first relay of data from one of the first auxiliary device and the second hearing device to the other via the first RF transceiver, wherein the first relay of data comprises the first primary RF communication and comprises the first secondary RF communication.

3. A first hearing device comprising:
a first RF transceiver, and
a first communication controller connected to the first RF transceiver,
the first hearing device being configured for facilitating first communication of data between a first auxiliary device and a second hearing device, wherein the first communication of data comprises:
first primary RF communication between the first hearing device and the first auxiliary device, wherein the first primary RF communication utilizes the first RF transceiver; first secondary communication between the first hearing device and the second hearing device; and
first relay of data from one of the first auxiliary device and the second hearing device to the other via the first RF transceiver, wherein the first relay of data comprises the first primary RF communication and comprises the first secondary communication.

4. The first hearing device according to item 3, wherein the first secondary communication comprises first secondary RF communication between the first hearing device and the second hearing device, wherein the first secondary RF communication utilizes the first RF transceiver.

5. The first hearing device according to any of the preceding items, wherein the first primary RF communication utilizes a first primary wireless communication protocol.

6. The first hearing device according to item 5, wherein the first primary wireless communication protocol is compatible with Bluetooth Low Energy as defined by a subset of the Bluetooth 4.0 Core Specification, and/or wherein the first primary wireless communication protocol includes any one or more of: Bluetooth, Bluetooth low energy, Wi-Fi, and ZigBee.

7. The first hearing device according to item 5 or 6, wherein the first auxiliary device is configured to operate as a central device and the first hearing device is configured to operate as a peripheral device.

8. The first hearing device according to any of the preceding items, wherein the first primary RF communication utilizes a first primary wireless connection between the first auxiliary device and the first hearing device.

9. The first hearing device according to item 8, wherein the first auxiliary device is configured to operate as a master device, and wherein the first hearing device is configured to operate as a slave device.

10. The first hearing device according to item 8 or 9, wherein the first primary RF communication comprises establishing the first primary wireless connection.

11. The first hearing device according to any of the items 8-10, dependent on item 1 or 4, wherein the first primary wireless connection is kept or sought kept during the first secondary RF communication.

12. The first hearing device according to any of items 8-11, wherein the first primary wireless connection is restored in case the first primary wireless connection is inadvertently broken during the first communication of data.

13. The first hearing device according to any of the preceding items, dependent on item 5 and dependent on item 1 or 4, wherein the first secondary RF communication utilizes a secondary wireless communication protocol, the secondary wireless communication protocol being different from the first primary wireless communication protocol.

14. The first hearing device according to item 13, wherein the first primary wireless communication protocol is a standard protocol and the secondary wireless communication protocol is a non-standard protocol.

15. The first hearing device according to item 13 or 14, wherein the first primary RF communication and the first secondary RF communication utilize the same carrier frequency, such as 2.4 GHz or another RF carrier frequency supported by the respective RF transceiver.

16. The first hearing device according to any of the preceding items, dependent on item 1 or 4, wherein the first primary RF communication utilizes a first primary wireless transmission scheme, and wherein the first secondary RF communication utilizes a secondary wireless transmission scheme.

17. The first hearing device according to item 16, wherein the first hearing device is configured for facilitating that the secondary wireless transmission scheme is provided and/or adjusted in response to the first primary wireless transmission scheme, such that coexistence of connection events of the first primary wireless transmission scheme and the secondary wireless transmission scheme are avoided or alleviated.

18. The first hearing device according to item 16 or 17, wherein the first hearing device is configured for facilitating that the secondary wireless transmission scheme and the first primary wireless transmission scheme are provided and/or adjusted in coordination with each other, such that coexistence of connection events of the first primary wireless transmission scheme and the secondary wireless transmission scheme are avoided or alleviated.

19. The first hearing device according to any of the preceding items, wherein the first hearing device comprises a first hearing aid comprising: a first microphone, a first receiver, and a first hearing loss processor.

20. The first hearing device according to item 19, wherein the first hearing loss processor comprises the first communication controller.

21. The first hearing device according to any of the preceding items, dependent on item 1 or 4, comprising a first RF antenna, wherein the first primary RF communication utilizes the first RF antenna, and wherein the first secondary RF communication utilizes the first RF antenna.

22. A binaural hearing device system comprising the first hearing device according to any of the preceding items and the second hearing device, wherein the second hearing device comprises a second RF transceiver and a second communication controller connected to the second RF transceiver, and wherein the second hearing device may be configured for communication with a second auxiliary device.

23. The binaural hearing device system according to item 22, wherein the second hearing device is configured for facilitating second communication of data between the second auxiliary device and the first hearing device, wherein the second communication of data comprises:

second primary RF communication between the second hearing device and the second auxiliary device, wherein the second primary RF communication utilizes the second RF transceiver; and second secondary communication between the second hearing device and the first hearing device.

24. The binaural hearing device system according to item 23, wherein the second secondary communication comprises second secondary RF communication between the second hearing device and the first hearing device, wherein the second secondary RF communication utilizes the second RF transceiver.

25. The binaural hearing device system according to item 23 or 24, wherein the second communication of data comprises second relay of data from one of the second auxiliary device and the first hearing device to the other via the second RF transceiver, wherein the second relay of data comprises the second primary RF communication and comprises the second secondary communication.

26. The binaural hearing device system according to any of the items 23-25, wherein the second primary RF communication utilizes a second primary wireless communication protocol.

27. The binaural hearing device system according to item 26, wherein the second primary wireless communication protocol is compatible with Bluetooth Low Energy as defined by a subset of the Bluetooth 4.0 Core Specification, and/or wherein the second primary wireless communication protocol includes any one or more of: Bluetooth, Bluetooth low energy, Wi-Fi, and ZigBee.

28. The binaural hearing device system according to item 26 or 27, dependent on item 5, wherein the second primary wireless communication protocol is the same as the first primary wireless communication protocol.

29. The binaural hearing device system according to any of the items 26-28, wherein the second auxiliary device is configured to operate as a central device and the second hearing device is configured to operate as a peripheral device.

30. The binaural hearing device system according to any of the items 23-29, wherein the second primary RF communication utilizes a second primary wireless connection between the second auxiliary device and the second hearing device.

31. The binaural hearing device system according to item 30, wherein the second auxiliary device is configured to operate as a master device, and wherein the second hearing device is configured to operate as a slave device.

32. The binaural hearing device system according to item 30 or 31, wherein the second primary RF communication comprises establishing the second primary wireless connection.

33. The binaural hearing device system according to any of the items 30-32, wherein the second primary wireless connection is kept or sought kept during the second secondary RF communication.

34. The binaural hearing device system according to item 33, wherein the second primary wireless connection is restored in case the second primary wireless connection is inadvertently broken during the second communication of data.

35. The binaural hearing device system according to any of items 23-34, dependent on item 13 and 26, wherein the second secondary RF communication utilizes the secondary wireless communication protocol, wherein the secondary wireless communication protocol is different from the second primary wireless communication protocol.

36. The binaural hearing device system according to item 35, wherein the second primary wireless communication protocol is a standard protocol and the secondary wireless communication protocol is a non-standard protocol.

37. The binaural hearing device system according to item 35 or 36, wherein the second primary RF communication and the second secondary RF communication utilizes the same carrier frequency, such as 2.4 GHz or another RF carrier frequency supported by the respective RF transceiver.

38. The binaural hearing device system according to any of the items 23-37, dependent on item 16, wherein the second primary RF communication utilizes a second primary wireless transmission scheme, and wherein the second secondary RF communication utilizes the secondary wireless transmission scheme.

39. The binaural hearing device system according to item 38, wherein the binaural hearing device system is configured for facilitating that the secondary wireless transmission scheme is provided and/or adjusted in response to the second primary wireless transmission scheme, such that coexistence of connection events of the second primary wireless transmission scheme and the secondary wireless transmission scheme are avoided or alleviated.

40. The binaural hearing device system according to item 38 or 39, wherein the binaural hearing device system is configured for facilitating that the secondary wireless transmission scheme and the second primary wireless transmission scheme are provided and/or adjusted in coordination with each other, such that coexistence of connection events of the second primary wireless transmission scheme and the secondary wireless transmission scheme are avoided or alleviated.

41. The binaural hearing device system according to any of the items 38-40, wherein the binaural hearing device system is configured for facilitating that the first primary wireless transmission scheme and the second primary wireless transmission scheme are provided and/or adjusted in coordination with each other, such that coexistence of connection events of the first primary wireless transmission scheme and the second primary wireless transmission scheme are aimed at and/or provided.

42. The binaural hearing device system according to item 41, wherein the binaural hearing device system is configured for utilizing a secondary wireless connection between the first hearing device and the second hearing device for the provision and/or adjustment in coordination of the first primary wireless transmission scheme and the second primary wireless transmission scheme.

43. The binaural hearing device system according to any of the items 22-42, dependent on item 19, wherein the second hearing device comprises a second hearing aid comprising: a second microphone, a second receiver, and a second hearing loss processor.
44. The binaural hearing device system according to item 43, wherein the second hearing loss processor comprises the second communication controller.
45. The binaural hearing device system according to any of the items 22-44, wherein the second hearing device comprises a second RF antenna.
46. The binaural hearing device system according to items 45, dependent on item 23, wherein the second primary RF communication utilizes the second RF antenna, and wherein the second secondary RF communication utilizes the second RF antenna.
47. The binaural hearing device system according to any of the items 22-46, wherein the binaural hearing device system is configured for facilitating third communication of data between the first auxiliary device and the second auxiliary device, wherein the third communication of data comprises:
third primary RF communication between the first hearing device and the first auxiliary device, wherein the third primary RF communication utilizes the first RF transceiver; third secondary RF communication between the second hearing device and the second auxiliary device, wherein the third secondary RF communication utilizes the second RF transceiver; and
third tertiary communication between the second hearing device and the first hearing device.
48. The binaural hearing device system according to item 47, wherein the third tertiary communication comprises third tertiary RF communication between the second hearing device and the first hearing device, and wherein the third tertiary RF communication utilizes the first RF transceiver and the second RF transceiver.
49. The binaural hearing device system according to item 47 or 48, wherein the third communication of data comprises third relay of data from one of the first auxiliary device and the second auxiliary device to the other via the first RF transceiver and the second RF transceiver, wherein the third relay of data comprises the third primary RF communication, the third secondary RF communication, and the third tertiary communication.
50. The binaural hearing device system according to any of the items 22-48, dependent on item 23, wherein the first auxiliary device comprises a first remote microphone device, and wherein the second auxiliary device comprises a second remote microphone device.
51. The binaural hearing device system according to any of the items 22-50, as dependent on item 43, wherein the first communication of data comprises any one or more of: communication of data for fitting of the first hearing aid and/or the second hearing aid; communication of data for debugging the first hearing aid and/or the second hearing aid; communication of data for controlling the first hearing aid and/or the second hearing aid; and communication of data for monitoring behaviour of the first hearing aid and/or the second hearing aid.
52. The binaural hearing device system according to item 51, wherein the second communication of data comprises any one or more of: communication of data for fitting of the first hearing aid and/or the second hearing aid; communication of data for debugging the first hearing aid and/or the second hearing aid; communication of data for controlling the first hearing aid and/or the second hearing aid; and communication of data for monitoring behaviour of the first hearing aid and/or the second hearing aid.

One or more embodiments may include any one or any combination of the following articles:
1. A method of providing communication of data, the method comprising providing first communication of data between a first auxiliary device and a second hearing device, wherein the step of providing first communication of data comprises: providing first primary RF communication between a first hearing device and the first auxiliary device; and
providing first secondary RF communication between the first hearing device and the second hearing device,
wherein the step of providing first primary RF communication comprises utilizing a first RF transceiver of the first hearing device, and wherein the step of providing first secondary RF communication comprises utilizing the first RF transceiver, and wherein the method may comprise controlling the first RF transceiver using a first communication controller of the first hearing device.
2. The method according to article 1, wherein the step of providing first communication of data comprises providing first relay of data from one of the first auxiliary device and the second hearing device to the other via the first RF transceiver, wherein the step of providing first relay of data comprises the step of providing first primary RF communication and comprises the step of providing first secondary RF communication.
3. A method of providing communication of data, the method comprising providing first communication of data between a first auxiliary device and a second hearing device, wherein the step of providing first communication of data comprises: providing first primary RF communication between a first hearing device and the first auxiliary device;
providing first secondary communication between the first hearing device and the second hearing device; and
providing first relay of data from one of the first auxiliary device and the second hearing device to the other via the first RF transceiver,
wherein the step of providing first relay of data comprises the step of providing first primary RF communication and comprises the step of providing first secondary communication, and wherein the step of providing first primary RF communication comprises utilizing a first RF transceiver of the first hearing device, and wherein the method may comprise controlling the first RF transceiver using a first communication controller of the first hearing device.
4. The method according to article 3, wherein the step of providing first secondary communication comprises providing first secondary RF communication between the first hearing device and the second hearing device, wherein the step of providing first secondary RF communication comprises utilizing the first RF transceiver.
5. The method according to any of the preceding articles, wherein the step of providing first primary RF communication comprises utilizing a first primary wireless communication protocol.
6. The method according to article 5, wherein the first primary wireless communication protocol is compatible with Bluetooth Low Energy as defined by a subset of the Bluetooth 4.0 Core Specification, and/or wherein the first primary wireless communication protocol includes any one or more of: Bluetooth, Bluetooth low energy, Wi-Fi, and ZigBee.

7. The method according to article 5 or 6, comprising operating the first auxiliary device as a central device and operating the first hearing device as a peripheral device.

8. The method according to any of the preceding articles, wherein the step of providing first primary RF communication comprises utilizing a first primary wireless connection between the first auxiliary device and the first hearing device.

9. The method according to article 8, comprising operating the first auxiliary device as a master device and operating the first hearing device as a slave device.

10. The method according to article 8 or 9, wherein the step of providing first primary RF communication comprises establishing the first primary wireless connection.

11. The method according to any of the articles 8-10, dependent on article 1 or 4, comprising keeping or seeking to keep the first primary wireless connection during the step of providing first secondary RF communication.

12. The method according to any of articles 8-11, comprising restoring the first primary wireless connection in case the first primary wireless connection is inadvertently broken during the step of providing first communication of data.

13. The method according to any of the preceding articles, dependent on article 5 and dependent on article 1 or 4, wherein the step of providing first secondary RF communication comprises utilizing a secondary wireless communication protocol, the secondary wireless communication protocol being different from the first primary wireless communication protocol.

14. The method according to article 13, wherein the first primary wireless communication protocol is a standard protocol and the secondary wireless communication protocol is a non-standard protocol.

15. The method according to article 13 or 14, comprising utilizing the same carrier frequency, such as 2.4 GHz or another RF carrier frequency supported by the respective RF transceiver, for the first primary RF communication and for the first secondary RF communication.

16. The method according to any of the preceding articles, dependent on article 1 or 4, wherein the step of providing first primary RF communication comprises utilizing a first primary wireless transmission scheme, and wherein the step of providing first secondary RF communication comprises utilizing a secondary wireless transmission scheme.

17. The method according to article 16, comprising providing and/or adjusting the secondary wireless transmission scheme in response to the first primary wireless transmission scheme, such that coexistence of connection events of the first primary wireless transmission scheme and the secondary wireless transmission scheme are avoided or alleviated.

18. The method according to article 16 or 17, comprising providing and/or adjusting the secondary wireless transmission scheme and the first primary wireless transmission scheme in coordination with each other, such that coexistence of connection events of the first primary wireless transmission scheme and the secondary wireless transmission scheme are avoided or alleviated.

19. The method according to any of the preceding articles, wherein the first hearing device comprises a first hearing aid comprising: a first microphone, a first receiver, and a first hearing loss processor.

20. The method according to article 19, wherein the first hearing loss processor comprises the first communication controller.

21. The method according to any of the preceding articles, dependent on article 1 or 4, wherein the first hearing device comprises a first RF antenna, and wherein the step of providing first primary RF communication comprises utilizing the first RF antenna, and wherein the step of providing first secondary RF communication comprises utilizing the first RF antenna.

22. The method according to any of the preceding articles, wherein the second hearing device comprises a second RF transceiver and a second communication controller connected to the second RF transceiver, the first hearing device and the second hearing device being of a binaural hearing device system, wherein the second hearing device may be configured for communication with a second auxiliary device.

23. The method according to article 22, comprising providing second communication of data between the second auxiliary device and the first hearing device, wherein the step of providing second communication of data comprises:
providing second primary RF communication between the second hearing device and the second auxiliary device; and
providing second secondary communication between the second hearing device and the first hearing device,
wherein the step of providing second primary RF communication comprises utilizing the second RF transceiver.

24. The method according to article 23, wherein the step of providing second secondary communication comprises providing second secondary RF communication between the second hearing device and the first hearing device, wherein the step of providing second secondary RF communication comprises utilizing the second RF transceiver.

25. The method according to article 23 or 24, wherein the step of providing second communication of data comprises providing second relay of data from one of the second auxiliary device and the first hearing device to the other via the second RF transceiver, wherein the step of providing second relay of data comprises the step of providing second primary RF communication and the step of providing second secondary communication.

26. The method according to any of the articles 23-25, wherein the step of providing second primary RF communication comprises utilizing a second primary wireless communication protocol.

27. The method according to article 26, wherein the second primary wireless communication protocol is compatible with Bluetooth Low Energy as defined by a subset of the Bluetooth 4.0 Core Specification, and/or wherein the second primary wireless communication protocol includes any one or more of: Bluetooth, Bluetooth low energy, Wi-Fi, and ZigBee.

28. The method according to article 26 or 27, dependent on article 5, wherein the second primary wireless communication protocol is the same as the first primary wireless communication protocol.

29. The method according to any of the articles 26-28, comprising operating the second auxiliary device as a central device and operating the second hearing device as a peripheral device.
30. The method according to any of the articles 23-29, wherein the step of providing second primary RF communication comprises utilizing a second primary wireless connection between the second auxiliary device and the second hearing device.
31. The method according to article 30, comprising operating the second auxiliary device as a master device and operating the second hearing device as a slave device.
32. The method according to article 30 or 31, wherein the step of providing second primary RF communication comprises establishing the second primary wireless connection.
33. The method according to any of the articles 30-32, comprising keeping or seeking to keep the second primary wireless connection during the step of providing second secondary RF communication.
34. The method according to article 33, comprising restoring the second primary wireless connection in case the second primary wireless connection is inadvertently broken during the step of providing second communication of data.
35. The method according to any of articles 23-34, dependent on article 13 and 26, wherein the step of providing second secondary RF communication comprises utilizing the secondary wireless communication protocol, wherein the secondary wireless communication protocol is different from the second primary wireless communication protocol.
36. The method according to article 35, wherein the second primary wireless communication protocol is a standard protocol and the secondary wireless communication protocol is a non-standard protocol.
37. The method according to article 35 or 36, comprising utilizing the same carrier frequency, such as 2.4 GHz or another RF carrier frequency supported by the respective RF transceiver, for the second primary RF communication and the second secondary RF communication.
38. The method according to any of the articles 23-37, dependent on article 16, wherein the step of providing second primary RF communication comprises utilizing a second primary wireless transmission scheme, and wherein the step of providing second secondary RF communication comprises utilizing the secondary wireless transmission scheme.
39. The method according to article 38, comprising providing and/or adjusting the secondary wireless transmission scheme in response to the second primary wireless transmission scheme, such that coexistence of connection events of the second primary wireless transmission scheme and the secondary wireless transmission scheme are avoided or alleviated.
40. The method according to article 38 or 39, comprising providing and/or adjusting the secondary wireless transmission scheme and the second primary wireless transmission scheme in coordination with each other, such that coexistence of connection events of the second primary wireless transmission scheme and the secondary wireless transmission scheme are avoided or alleviated.
41. The method according to any of the articles 38-40, comprising providing and/or adjusting the first primary wireless transmission scheme and the second primary wireless transmission scheme in coordination with each other, such that coexistence of connection events of the first primary wireless transmission scheme and the second primary wireless transmission scheme are aimed at and/or provided.
42. The method according to article 41, comprising utilizing a secondary wireless connection between the first hearing device and the second hearing device for the step of providing and/or adjusting the first primary wireless transmission scheme and the second primary wireless transmission scheme in coordination with each other.
43. The method according to any of the articles 22-42, dependent on article 19, wherein the second hearing device comprises a second hearing aid comprising: a second microphone, a second receiver, and a second hearing loss processor.
44. The method according to article 43, wherein the second hearing loss processor comprises the second communication controller.
45. The method according to any of the articles 22-44, wherein the second hearing device comprises a second RF antenna.
46. The method according to articles 45, dependent on article 23, wherein the step of providing second primary RF communication comprises utilizing the second RF antenna, and wherein the step of providing second secondary RF communication comprises utilizing the second RF antenna.
47. The method according to any of the articles 22-46, comprising providing third communication of data between the first auxiliary device and the second auxiliary device, wherein the step of providing third communication of data comprises:
providing third primary RF communication between the first hearing device and the first auxiliary device;
providing third secondary RF communication between the second hearing device and the second auxiliary device; and
providing third tertiary communication between the second hearing device and the first hearing device,
wherein the step of providing third primary RF communication comprises utilizing the first RF transceiver, and wherein the step of providing third secondary RF communication comprises utilizing the second RF transceiver.
48. The method according to article 47, wherein the step of providing third tertiary communication comprises providing third tertiary RF communication between the second hearing device and the first hearing device, and wherein the step of providing third tertiary RF communication comprises utilizing the first RF transceiver and the second RF transceiver.
49. The method according to article 47 or 48, wherein the step of providing third communication of data comprises providing third relay of data from one of the first auxiliary device and the second auxiliary device to the other via the first RF transceiver and the second RF transceiver, wherein the step of providing third relay of data comprises the step of providing third primary RF communication, the step of providing third secondary RF communication, and the step of providing third tertiary communication.
50. The method according to any of the articles 22-48, dependent on article 23, wherein the first auxiliary device comprises a first remote microphone device, and wherein the second auxiliary device comprises a second remote microphone device.

51. The method according to any of the articles 22-50, as dependent on article 43, wherein the step of providing first communication of data comprises providing communication of data for fitting and/or debugging and/or monitoring behavior of the first hearing aid and/or the second hearing aid.

52. The method according to article 51, wherein the step of providing second communication of data comprises providing communication of data for fitting and/or debugging and/or monitoring behavior of the first hearing aid and/or the second hearing aid.

LIST OF REFERENCE NUMBERS

The following represents a list of reference numbers utilized within the appended drawings, wherein the reference numbers 10, 110, 14, 114, 16, 24, 26, 32, 34, 35, 44, 45, 50, 52, 53, 54, and 56, may have an "L" or "R" as suffix, wherein the suffix "L" may refer to a first, such as a left, and wherein the suffix "R" may refer to a second, such as a right.
10: a hearing device, such as a hearing aid.
110: a hearing device, such as a hearing aid.
12: a wireless connection (e.g. denoted communication channel or link), e.g. configured for bi-directional communication.
12L: a first primary wireless connection.
12R: a second primary wireless connection.
12E: a secondary wireless connection.
14: a circuit, such as a hearing aid circuit, of a hearing device.
114: a circuit, such as a hearing aid circuit, of a hearing device.
16: a microphone of a hearing device.
24: a hearing loss processor of a hearing device.
26: a communication controller of a hearing device.
32: a receiver, such as a speaker, of a hearing device.
34: an RF transceiver of a hearing device.
35: an NF transceiver of a hearing device.
44: an RF antenna of a hearing device.
45: an NF antenna of a hearing device.
50: an auxiliary device.
52: a processing unit of an auxiliary device.
53: an RF antenna of an auxiliary device, e.g. forming an integrate part of a respective auxiliary device.
54: an RF transceiver of an auxiliary device.
56: a communication controller of an auxiliary device.
60, 460, 560, 660, 760, 860, 960, 1060: a method of providing communication of data.
62, 462: first communication of data.
64: first primary RF communication.
66: first secondary communication, which may comprise first secondary RF communication.
68: first relay of data.
72, 672: second communication of data.
74: second primary RF communication.
76: second secondary communication, which may comprise second secondary RF communication.
78, 678: second relay of data.
82, 882, 982, 1082: third communication of data.
84, 984: third primary RF communication.
86: third secondary RF communication.
87, 987: third tertiary communication, which may comprise third tertiary RF communication.
88, 888, 988, 1088: third relay of data.

Although particular embodiments have been shown and described, it will be understood that they are not intended to limit the claimed inventions, and it will be obvious to those skilled in the art that various changes and modifications may be made without departing from the scope of the claimed inventions. The specification and drawings are, accordingly, to be regarded in an illustrative rather than restrictive sense. The claimed inventions are intended to cover alternatives, modifications, and equivalents.

The following are examples of one or more embodiments:

1. A first hearing device comprising:
a first RF transceiver, and
a first communication controller connected to the first RF transceiver, the first hearing device being configured for facilitating first communication of data between a first auxiliary device and a second hearing device, wherein the first communication of data comprises:
first primary RF communication between the first hearing device and the first auxiliary device, wherein the first primary RF communication utilizes the first RF transceiver; and first secondary RF communication between the first hearing device and the second hearing device, wherein the first secondary RF communication utilizes the first RF transceiver.

2. The first hearing device according to example 1, wherein the first communication of data comprises first relay of data from one of the first auxiliary device and the second hearing device to the other via the first RF transceiver, wherein the first relay of data comprises the first primary RF communication and comprises the first secondary RF communication.

3. The first hearing device according to any of the preceding examples, wherein the first primary RF communication utilizes a first primary wireless communication protocol being compatible with Bluetooth Low Energy as defined by a subset of the Bluetooth 4.0 Core Specification.

4. The first hearing device according to any of the preceding examples, wherein the first primary RF communication utilizes a first primary wireless connection between the first auxiliary device and the first hearing device, wherein the first auxiliary device is configured to operate as a master device, and wherein the first hearing device is configured to operate as a slave device.

5. The first hearing device according to any of the preceding examples, wherein the first primary RF communication utilizes a first primary wireless transmission scheme, and wherein the first secondary RF communication utilizes a secondary wireless transmission scheme, and wherein the first hearing device is configured for facilitating that the secondary wireless transmission scheme is provided in coordination with the first primary wireless transmission scheme, such that coexistence of connection events of the first primary wireless transmission scheme and the secondary wireless transmission scheme are avoided or alleviated.

6. The first hearing device according to any of the preceding examples, wherein the first hearing device comprises a first hearing aid comprising: a first microphone, a first receiver, and a first hearing loss processor.

7. A binaural hearing device system comprising the first hearing device according to any of the preceding examples and the second hearing device, wherein the second hearing device comprises a second RF transceiver and a second communication controller connected to the second RF transceiver, and wherein the second hearing device is configured for communication with a second auxiliary device.

8. The binaural hearing device system according to example 7, wherein the second hearing device is configured for facilitating second communication of data between the second auxiliary device and the first hearing device, wherein the second communication of data comprises:
second primary RF communication between the second hearing device and the second auxiliary device, wherein the second primary RF communication utilizes the second RF transceiver; and
second secondary RF communication between the second hearing device and the first hearing device, wherein the second secondary RF communication utilizes the second RF transceiver.

9. The binaural hearing device system according to example 8, wherein the second primary RF communication comprises utilizing a second primary wireless connection between the second auxiliary device and the second hearing device, wherein the second auxiliary device is configured to operate as a master device, and wherein the second hearing device is configured to operate as a slave device.

10. The binaural hearing device system according to any of the examples 8-9, dependent on example 5, wherein the second primary RF communication utilizes a second primary wireless transmission scheme, and wherein the second secondary RF communication utilizes the secondary wireless transmission scheme, and wherein the binaural hearing device system is configured for facilitating that the secondary wireless transmission scheme is provided in coordination with the second primary wireless transmission scheme, such that coexistence of connection events of the second primary wireless transmission scheme and the secondary wireless transmission scheme are avoided or alleviated, and wherein the binaural hearing device system is configured for facilitating that the first primary wireless transmission scheme and the second primary wireless transmission scheme are provided in coordination with each other, such that coexistence of connection events of the first primary wireless transmission scheme and the second primary wireless transmission scheme are provided, and wherein the binaural hearing device system is configured for utilizing a secondary wireless connection between the first hearing device and the second hearing device for the provision in coordination of the first primary wireless transmission scheme and the second primary wireless transmission scheme.

11. The binaural hearing device system according to any of the examples 7-10, dependent on example 6, wherein the second hearing device comprises a second hearing aid comprising: a second microphone, a second receiver, and a second hearing loss processor.

12. The binaural hearing device system according to any of the examples 7-11, wherein the binaural hearing device system is configured for facilitating third communication of data between the first auxiliary device and the second auxiliary device, wherein the third communication of data comprises:
third primary RF communication between the first hearing device and the first auxiliary device, wherein the third primary RF communication utilizes the first RF transceiver; third secondary RF communication between the second hearing device and the second auxiliary device, wherein the third secondary RF communication utilizes the second RF transceiver; and
third tertiary RF communication between the second hearing device and the first hearing device, wherein the third tertiary RF communication utilizes the first RF transceiver and the second RF transceiver.

13. The binaural hearing device system according to any of the examples 7-12, wherein the first auxiliary device comprises a first remote microphone device and the second auxiliary device comprises a second remote microphone device.

14. The binaural hearing device system according to any of the examples 7-13, dependent on example 11, wherein the first communication of data comprises any one or more of: communication of data for fitting of the first hearing aid and/or the second hearing aid; communication of data for debugging the first hearing aid and/or the second hearing aid; communication of data for controlling the first hearing aid and/or the second hearing aid; and communication of data for monitoring behaviour of the first hearing aid and/or the second hearing aid.

15. A method of providing communication of data, the method comprising providing first communication of data between a first auxiliary device and a second hearing device, wherein the step of providing first communication of data comprises:
providing first primary RF communication between a first hearing device and the first auxiliary device; and
providing first secondary RF communication between the first hearing device and the second hearing device,
wherein the step of providing first primary RF communication comprises utilizing a first RF transceiver of the first hearing device, and wherein the step of providing first secondary RF communication comprises utilizing the first RF transceiver, and wherein the method comprises controlling the first RF transceiver using a first communication controller of the first hearing device.

The invention claimed is:
1. A binaural hearing system comprising a first hearing device and a second hearing device, wherein:
the first hearing device comprises a first RF transceiver and a first communication controller connected to the first RF transceiver;
the first hearing device is configured to communicate with a first auxiliary device;
the second hearing device comprises a second RF transceiver and a second communication controller connected to the second RF transceiver;
the second hearing device is configured to communicate with a second auxiliary device; and
the binaural hearing system is configured to facilitate a communication of data between the first auxiliary device and the second auxiliary device by:
performing a primary communication with the first auxiliary device utilizing the first RF transceiver of the first hearing device;
performing a secondary communication with the second auxiliary device utilizing the second RF transceiver of the second hearing device; and
performing a tertiary communication between the second hearing device and the first hearing device;
wherein the binaural hearing system is configured to perform the primary communication before the tertiary communication, and to perform the tertiary communication before the secondary communication.

2. The binaural hearing system according to claim 1, wherein:
- the first hearing device comprises a first NF transceiver connected to the first communication controller;
- the second hearing device comprises a second NF transceiver connected to the second communication controller; and
- the binaural hearing system is configured to perform the tertiary communication utilizing the first NF transceiver and the second NF transceiver.

3. The binaural hearing system according to claim 1, wherein the tertiary communication comprises a RF communication between the second hearing device and the first hearing device.

4. The binaural hearing system according to claim 1, wherein the binaural hearing system is configured to relay the data from one of the first auxiliary device and the second auxiliary device to the other one of the first auxiliary device and the second auxiliary device, utilizing the first RF transceiver and the second RF transceiver.

5. The binaural hearing system according to claim 1, wherein the first hearing device comprises a first hearing aid comprising: a first microphone, a first receiver, and a first hearing loss processor; and
- wherein the second hearing device comprises a second hearing aid comprising: a second microphone, a second receiver, and a second hearing loss processor.

6. The binaural hearing system according to claim 1, wherein the first auxiliary device comprises a first remote microphone device.

7. The binaural hearing system according to claim 1, wherein the communication of data comprises a communication of control data from one of the first auxiliary device and the second auxiliary device to the other one of the first auxiliary device and the second auxiliary device, and wherein the control data is for controlling the other one of the first auxiliary device and the second auxiliary device.

8. The binaural hearing system according to claim 1, wherein the first hearing device is configured to receive the data from the first auxiliary device and to transmit the data to the second hearing device; and
- wherein the second hearing device is configured to receive the data from the first hearing device, and to transmit the data to the second auxiliary device.

9. The binaural hearing system according to claim 1, wherein the primary communication, the secondary communication, and the tertiary communication are associated with each other.

10. A method performed by a binaural hearing system to facilitate communication of data between a first auxiliary device and a second auxiliary device, the binaural hearing system comprising a first hearing device and a second hearing device, the method comprising:
- performing, by the first hearing device of the binaural hearing system, a primary communication with the first auxiliary device;
- performing, by the second hearing device of the binaural hearing system, a secondary communication with the second auxiliary device; and
- performing a tertiary communication between the second hearing device and the first hearing device of the binaural hearing system;
- wherein the primary communication is performed by the first hearing device utilizing a first RF transceiver of the first hearing device, and wherein the secondary communication is performed by the second hearing device utilizing a second RF transceiver of the second hearing device;
- wherein the primary communication is performed before the tertiary communication, and wherein the tertiary communication is performed before the secondary communication.

11. The method according to claim 10, wherein the first hearing device comprises a first NF transceiver, and the second hearing device comprises a second NF transceiver; and
- wherein the binaural hearing system is configured to perform the tertiary communication utilizing the first NF transceiver and the second NF transceiver.

12. The method according to claim 10, wherein the third tertiary communication is performed utilizing the first RF transceiver and the second RF transceiver.

13. The method according to claim 10, wherein the primary communication, the secondary communication, and the tertiary communication are performed to relay the data from one of the first auxiliary device and the second auxiliary device to the other one of the first auxiliary device and the second auxiliary device.

14. The method according to claim 10, wherein the first hearing device comprises a first hearing aid comprising: a first microphone, a first receiver, and a first hearing loss processor, and
- wherein the second hearing device comprises a second hearing aid comprising: a second microphone, a second receiver, and a second hearing loss processor.

15. The method according to claim 10, wherein the first auxiliary device comprises a first remote microphone device.

16. The method according to claim 10, wherein the communication of data comprises a communication of control data from one of the first auxiliary device and the second auxiliary device to the other one of the first auxiliary device and the second auxiliary device, and wherein the control data is for controlling the other one of the first auxiliary device and the second auxiliary device.

17. The method according to claim 10, wherein the communication of data comprises a communication of status data from one of the first auxiliary device and the second auxiliary device to the other one of the first auxiliary device and the second auxiliary device, and wherein the status data indicates a status of the first auxiliary device or a status of the second auxiliary device.

18. The method according to claim 10, wherein the primary communication is performed by the first hearing device receiving the data from the first auxiliary device;
- wherein the tertiary communication is performed by the first hearing device transmitting the data to the second hearing device; and
- wherein the secondary communication is performed by the second hearing device transmitting the data to the second auxiliary device.

19. The method according to claim 10, wherein the primary communication, the secondary communication, and the tertiary communication are associated with each other.

* * * * *